US006976089B2

(12) United States Patent
Na et al.

(10) Patent No.: US 6,976,089 B2
(45) Date of Patent: Dec. 13, 2005

(54) METHOD FOR HIGH SPEED DISCRIMINATION OF POLICY IN PACKET FILTERING TYPE FIREWALL SYSTEM

(75) Inventors: Won-Taek Na, Seoul (KR); Tae-Soo Shin, Kwangmyoung-si (KR)

(73) Assignee: Secul.com Corp., Seoul (KR)

( * ) Notice: Subject to any disclaimer, the term of this patent is extended or adjusted under 35 U.S.C. 154(b) by 764 days.

(21) Appl. No.: 09/969,790

(22) Filed: Oct. 4, 2001

(65) Prior Publication Data
US 2002/0165949 A1 Nov. 7, 2002

(30) Foreign Application Priority Data
Apr. 17, 2001 (KR) ................................ 2001-20524

(51) Int. Cl.[7] ........................ G06F 15/173; G06F 15/16
(52) U.S. Cl. ...................... 709/242; 709/238; 709/223; 709/228; 709/240
(58) Field of Search .............................. 709/223–225, 709/227–228, 238–242, 236, 231; 713/201; 370/231, 235, 230, 229

(56) References Cited
U.S. PATENT DOCUMENTS 5,797,128 A * 8/1998 Birnbaum ...................... 707/5
5,951,651 A * 9/1999 Lakshman et al. ........... 709/239
5,990,810 A * 11/1999 Williams ....................... 341/51
6,529,508 B1 * 3/2003 Li et al. ....................... 370/392
6,604,143 B1 * 8/2003 Nagar et al. ................. 709/229
6,691,168 B1 * 2/2004 Bal et al. ..................... 709/238
6,850,521 B1 * 2/2005 Kadambi et al. ........... 370/389

* cited by examiner

Primary Examiner—Ario Etienne
Assistant Examiner—Hussein El-chanti
(74) Attorney, Agent, or Firm—Bacon & Thomas, PLLC

(57) ABSTRACT

The step of setting policy set tables includes the steps of generating one or more first-order policy set tables corresponding to one or more sections of packet information, respectively, each of said first-order policy set tables containing at least one policy sets having a predetermined number of policy members to be related with the corresponding section of the packet information; and pairing off said plurality of policy set tables to generate next-order policy set tables with all possible intersections of the paired first-order policy set tables. The step of discriminating the policy includes the steps of extracting one or more sections of packet information related to the policy information from the incoming packet; and querying to each of all the generated policy set tables with respective index values corresponding to each of the extracted packet information sections to discriminate the final policy for the incoming packet.

13 Claims, 25 Drawing Sheets

| priority of policy | source IP address | destination IP address | source port | destination port | protocol | direction | TCP FLAG |
|---|---|---|---|---|---|---|---|
| policy N | S1<S<S2 | D1<D<D2 | P1<P<P2 or P=P3,P4 | Q1<Q<Q2 or Q=Q3,Q4 | TCP | external | Sync or Ack |

FIG. 4 first-order policy set table(1):

| policy set No. | members of policy set |
|---|---|
| 0 | policy1,policy3,policy6... |
| 1 | policy2,policy8,policy10... |
| ⋮ | ⋮ |
| J | policyN,policyM... |
| ⋮ | ⋮ |
| MAX | policy1,policy4... | second-order policy set table(1):
intersections of first-order policy set tables(1)and(2)

| policy intersection No. | members of intersection |
|---|---|
| 0 | policy1,policy6... |
| 1 | policy8,policy10... |
| ⋮ | ⋮ |
| M | policyN,policyM... |
| ⋮ | ⋮ |
| MAX | policy1,policy4... | first-order policy set table(2):

| policy set No. | members of policy set |
|---|---|
| 0 | policy1,policy3,policy6... |
| 1 | policy2,policy8,policy10... |
| ⋮ | ⋮ |
| K | policyN,policyM... |
| ⋮ | ⋮ |
| MAX | policy1,policy4... |

FIG. 8 second-order policy set table(1):
intersections of first-order policy set
tables(1)and(2)

| policy intersection No. | members of intersection |
|---|---|
| 0 | policy1,policy6... |
| 1 | policy8,policy10... |
| ○○○ | ○○○ |
| M | policyN,policyM... |
| ○○○ | ○○○ |
| MAX | policy1,policy4... | second-order policy set table(2):
intersections of first-order policy set
tables(3)and(4)

| policy intersection No. | members of policy set |
|---|---|
| 0 | policy1,policy6... |
| 1 | policy7,policy9... |
| ○○○ | ○○○ |
| K | policyN,policyM... |
| ○○○ | ○○○ |
| MAX | policy1,policy4... | third-order policy set table(1):
intersections of second-order policy set
tables(1)and(2)

| policy intersection No. | members of intersection |
|---|---|
| 0 | policy1,policy6... |
| 1 | policy7,policy9... |
| ○○○ | ○○○ |
| M | policyN,policyM... |
| ○○○ | ○○○ |
| MAX | policy1,policy4... |

FIG. 9 third-order policy set table(1):
intersections of second-order policy set tables(1)and(2)

| policy intersection No. | members of intersection |
|---|---|
| 0 | policy1,policy6... |
| 1 | policy7,policy9... |
| ○○○ | ○○○ |
| J | policyN,policyM... |
| ○○○ | ○○○ |
| MAX | policy1,policy4... | third-order policy set table(2):
intersections of second-order policy set tables(3)and(4)

| policy intersection No. | members of policy set |
|---|---|
| 0 | policy1,policy8... |
| 1 | policy3,policy5... |
| ○○○ | ○○○ |
| K | policyN,policyL... |
| ○○○ | ○○○ |
| MAX | policy1,policy9... | fourth-order policy set table:
only highest priority policy of respective intersections of third-order policy set tables(1)and(2)

| policy intersection No. | highest priorty policy of intersection |
|---|---|
| 0 | policy1 |
| 1 | policy8 |
| ○○○ | ○○○ |
| M | policyN |
| ○○○ | ○○○ |
| MAX | policy1 |

FIG. 10

|   | source address | destination address | source port | destination port | protocol | TCP-Flag | interface |
|---|---|---|---|---|---|---|---|
| A | Any | 20.20.20.20 | Any | 80 | TCP | Any | Any |
| B | 30.30.0.0/16 | Any | 53 | Any | UDP | Any | Any |
| C | 1.1.1.1~2 | Any | 1000~2000 | 80 | TCP | Any | Any |
| D | Any | Any | Any | Any | Any | Any | Any |

FIG. 14

| first-order (mapping) table#1 | | first-order (mapping) table#2 | | first-order (mapping) table#3 | | first-order (mapping) table#4 | |
|---|---|---|---|---|---|---|---|
| variable | first-order set No. | variable | first-order set No. | variable | first-order set No. | variable | first-order set No. |
| 0 | 0 | 0 | 0 | 0 | 0 | 0 | 0 |
| ⋮ | ⋮ | ⋮ | ⋮ | ⋮ | ⋮ | ⋮ | ⋮ |
| 257 | 1 | 257 | 1 | 5140 | 1 | 5150 | 0 |
| ⋮ | ⋮ | 258 | 1 | . | . | . | . |
| 7710 | 2 | ⋮ | ⋮ | . | . | . | . |
| ⋮ | ⋮ | ⋮ | ⋮ | . | . | . | . |
| 65535 | 0 | 65535 | 0 | 65535 | 0 | 65535 | 0 |

| first-order policy set table#1 | | first-order policy set table#2 | | first-order policy set table#3 | | first-order policy set table#4 | |
|---|---|---|---|---|---|---|---|
| set No. (index) | members of set | set No. (index) | members of set | set No. (index) | members of set | set No. (index) | members of set |
| 0 | A,D | 0 | A,B,D | 0 | B,C,D | 0 | B,C,D |
| 1 | A,C,D | 1 | A,B,C,D | 1 | A,B,C,D | 1 | A,B,C,D |
| 2 | A,B,D | | | | | | |

| first-order (mapping) table#5 | | first-order (mapping) table#6 | | first-order (mapping) table#7 | |
|---|---|---|---|---|---|
| variable | first-order set No. | variable | first-order set No. | variable | first-order set No. |
| 0 | 0 | 0 | 0 | 0 | 0 |
| ⋮ | ⋮ | ⋮ | ⋮ | ⋮ | ⋮ |
| 53 | 1 | 80 | 1 | 1336 | 1 |
| ⋮ | ⋮ | . | . | ⋮ | ⋮ |
| 1500 | 2 | . | . | 1591 | 1 |
| ⋮ | ⋮ | . | . | ⋮ | ⋮ |
| 2000 | 2 | . | . | 1668 | 1 |
| ⋮ | ⋮ | . | . | ⋮ | ⋮ |
| 65535 | 0 | 65535 | 0 | 4607 | 2 |
| | | | | ⋮ | ⋮ |
| | | | | 65535 | 0 |

| first-order policy set table#5 | | first-order policy set table#6 | | first-order policy set table#7 | |
|---|---|---|---|---|---|
| set No. (index) | members of set | set No. (index) | members of set | set No. (index) | members of set |
| 0 | A,D | 0 | B,D | 0 | D |
| 1 | A,B,D | 1 | A,B,C,D | 1 | A,C,D |
| 2 | A,C,D | | | 2 | B,D |

FIG. 15 first-order policy set table#1

| set No.X1 (index) | members of set |
|---|---|
| 0 | A,D |
| 1 | A,C,D |
| 2 | A,B,D | first-order policy set table#2

| set No.y1 (index) | members of set |
|---|---|
| 0 | A,B,D |
| 1 | A,B,C,D |

} n second-order (mapping) table#1

| variable | second-order set No. |
|---|---|
| 0 | 0 |
| 1 | 0 |
| 2 | 0 |
| 3 | 1 |
| 4 | 2 |
| 5 | 2 | second-order policy set table#1

| set No. (index) | members of set |
|---|---|
| 0 | A,D |
| 1 | A,C,D |
| 2 | A,B,D |

FIG. 16 third-order policy set table#1

| set No. (index) | members of set |
|---|---|
| 0 | D |
| 1 | A,D |
| 2 | A,C,D |
| 3 | B,D | third-order policy set table#2

| set No. (index) | members of set |
|---|---|
| 0 | D |
| 1 | B,D |
| 2 | C,D |
| 3 | A,D |
| 4 | A,B,D |
| 5 | A,C,D | fourth-order final policy set table#1

| variable | final discrimination policy |
|---|---|
| 1 | D |
| 2 | D |
| 3 | D |
| 4 | D |
| 5 | D |
| 6 | D |
| 7 | D |
| 8 | D |
| 9 | A |
| 10 | A |
| 11 | A |
| 12 | D |
| 13 | D |
| 14 | C |
| 15 | A |
| 16 | A |
| 17 | A |
| 18 | D |
| 19 | B |
| 20 | D |
| 21 | D |
| 22 | B |
| 23 | D |

FIG. 20

| source address | destination address | source port | destination port | protocol | TCP-Flag | interface |
|---|---|---|---|---|---|---|
| 1.1.1.2 | 20.20.20.30 | 1500 | 80 | TCP | SYN | internal |

FIG. 21

METHOD FOR HIGH SPEED DISCRIMINATION OF POLICY IN PACKET FILTERING TYPE FIREWALL SYSTEM

BACKGROUND OF THE INVENTION

1. Field of the Invention

The present invention relates to a method for high speed discrimination of security policy in a packet filtering type firewall system by reducing delay time required for policy discrimination for incoming packets to improve performance of a network, and more particularly to a method for high speed discrimination of policy in the packet filtering type firewall system by discriminating one of the policies set by a user at high speed for each of all the TCP/IP packets incoming to a firewall. Also, the present invention relates to a method for high speed discrimination of policy in a firewall system that can maintain high speed performance using a firewall based on a high speed traffic policy distinction algorithm regardless of the number of policies set by a user and the number of currently connected sessions.

2. Discussion of the Related Art

Generally, a firewall located in a traffic concentrated point between a network to be protected and an unreliable network is a major technology for a network security solution that examines all traffics between the two networks in light of policies set by a user so that traffics contrary to the policies are filtered but traffics coincident with the policies are selected and passed.

Recently, various kinds of more intellectual hacking technologies have been generalized so that anyone can abuse them. For this reason, hacking damage is on an increasing trend geometrically. In this respect, for secure networking, a firewall is essentially required in networks in corporations, organized groups, educational institutions, and the like.

However, installation of the firewall causes some problems. One of the problems is that network performance may be deteriorated according to deterioration of traffic speed due to installation of the firewall. Another problem is that the firewall cannot actively conform to variable network environments since the firewall is a passive system that performs a function designated by a communication program operator. Among the problems, firewall users particularly suffer difficulty from deterioration of network performance. Performance of the firewall cannot keep up with growth of speed of Internet traffics, which are even doubled in just several months.

A prior art firewall system includes a proxy access mode and a packet filtering mode. The proxy access mode cuts off direct access of users in a traffic concentrated point and applies polices based on information of the users and information of receiving parties. The proxy access mode has low performance because it intercepts every access from users to direct the network session by proxy. And, it requires delay time for policy discrimination. Also, since the proxy access mode occupies many system resources whenever session is generated, the number of concurrently connectable sessions is very low.

On the other hand, the packet-filtering mode examines all packets between the two networks in the traffic concentration point in light of the policies one by one so that it performs filtering and passing actions on every packet. In this case, the packet-filtering mode has more preferable performance than the proxy access mode, since a separate program is not required in this mode of firewall system and sessions are not cut off for redirection by proxy. Recently, most of the network communication traffics are processed by the packet-filtering mode while some special communication modes are processed by the proxy access mode.

However, the firewall system adapting a packet-filtering mode fails to completely process growing amount of Internet traffics, which are rapidly increased recently, even though it is superior to the proxy access mode in performance. This is caused by delay time generated when all packets are examined in light of set of policies one by one. More than 80% of deterioration in performance of the firewall system based on the packet filtering mode is due to delay time required for policy discrimination.

Therefore, in order to improve performance of network, it is necessary to reduce delay time required for discriminating policy on a packet. Prior art technologies for policy discrimination for packet can be classified as follows.

First, as a simplest type, selected data fields of each packet are extracted as shown in FIG. 1 and all policies set by a user are sequentially inspected one by one to find out the congruent policies with extracted data. In this case, if the number of the policies is 100, average deterioration in performance reaches more than 50 times as compared with a case having one policy. That is, if the number of policies or the number of currently connected sessions increases, distinction work of the whole packets consumes long-time, thereby resulting in deterioration of network performance.

Second, as shown in FIG. 2, the possible changes of every packet data are tabled, and a table corresponding to an input packet is directly searched. In this case, since it is possible to find a corresponding policy by one time calculation after extracting each packet data, policy discrimination can be performed regardless of the number of policies and the number of concurrently connected sessions. Since an amount of data in a packet required for policy discrimination on the packet is 112 bits, the number of all possible cases reaches a value of $2^{112}$, i.e., 5,192,296,858,534,827,628,530, 496,329,220,110. Accordingly, it is impossible to constitute a table having such a size in a memory of a system.

Third, since it is likely that same types of packets transmitted in groups, inspection of a first type is performed for a new first packet so that the corresponding packet data is stored in a designated memory together with a discriminated policy number. From a second packet, it is inspected whether there exist same type of packets in a designated memory. If so, the second packet is discriminated to obey the policy corresponding to the policy number stored with the matched packet in the designated memory. In this case, performance of the firewall system is determined depending on how many different types of the sessions are currently connected. This is because that if many different types of the sessions are connected simultaneously, the probability that same types of packets are transmitted in groups is rapidly reduced.

Fourth, there is provided a method in which IP address may be retrieved bit by bit in such a manner as Compressed Multibit Trie Algorithm. However, since various policies cannot be supported in this method, there are some problems in commercially using the method in the firewall system.

Because of the above-mentioned problems, similar types as the third method and their modifications can support high speed performance to some extent. However, the performance of this method is affected by the number of concurrently connected sessions. As a simple example, suppose that system that can process 50000 packets per a second is requested 2000 sessions simultaneously. In this case, 2000 new sessions are processed within 1 second and packets are processed at a speed of 50000 packets per a second during the remaining time after completion of the 2000 new session processes. If the required time for inspection of one policy is 1 microsecond and the number of policies is 200, average 100 policies per one session should be inspected. In this case, 100 microseconds per one session will be required. Thus, the required time for 2000 accesses is 200 milliseconds. In this case, the number of packets that can be processed per 1 second is reduced to 42000 packets, thereby resulting in deterioration of performance about 20%. Accordingly, under the user environment that requests a firewall system of high performance, it is necessary to minimize the required time for policy discrimination.

SUMMARY OF THE INVENTION

Accordingly, the present invention is directed to a method for high speed discrimination of policy in a packet filtering type firewall system that substantially obviates one or more of the problems due to limitations and disadvantages of the prior art.

An object of the present invention is to provide a method for high speed discrimination of policy in a packet filtering type firewall system that can maintain high speed performance using a firewall based on a high speed traffic policy distinction algorithm regardless of the number of policies set by a user and the number of concurrently connected sessions.

Another object of the present invention is to provide a method for high speed discrimination of policy in a packet filtering type firewall system in which a policy coincident with an input packet data is discriminated at more high speed regardless of the number of policies set by a user and the number of concurrently connected sessions, so that delay time required for policy discrimination is minimized, thereby improving performance of a network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for high speed discrimination of a policy in a packet filtering type firewall system comprises the steps of setting policy set tables and discriminating a policy.

The step of setting policy set tables for minimizing a required time to discriminate the policy among a plurality of policies for an incoming packet, wherein the step of setting policy set tables comprising the sub-steps of: (a1) generating a plurality of first-order policy set tables containing policy information to be compared with packet information sectioned by a predetermined bits in the packet; (a2) pairing off the plurality of first-order policy set tables arbitrarily, and generating a plurality of second-order policy set tables constituted policy members which belong to both paired first-order policy set tables; and (a3) generating sequentially at least one post-second order policy set tables including k-th (where, $3 \leq k$, k is a natural number) order policy set tables by pairing off (k-1)-th order policy set tables arbitrarily, and generating k-th order policy set tables constituted the policy members which belong to paired (k-1)-th order policy set tables in common.

The step of discriminating the policy firstly conformed to each condition of the fields of the incoming packet information from the plurality of policies as a final policy corresponding to the packet, wherein the step of discriminating a policy comprising the steps of: (b1) sectioning the packet to obtain the packet sections, and extracting the packet variables which is an object to be compared with the policy information contained in the first-order policy set tables; and (b2) querying to the first through K-th order policy set tables sequentially by using the index values corresponding to the packet variables extracted from the packet sections obtained by sectioning the packet with the predetermined bits, and discriminating the final policy by using the queried index values.

The step of setting policy set tables further comprises the steps of generating a predetermined number of tables so that the first-order policy set tables constituted with the predetermined number by the user is correspondence to the number of the sectioned packet with the predetermined bits; pairing off the first-order policy set tables arbitrarily, and generating second-order policy set tables constituted all available intersections of the paired first-order policy set tables; pairing off the second-order policy set tables arbitrarily, and generating third-order policy set tables constituted all available intersections of the paired second-order policy set tables; and generating fourth-order policy set table constituted all available intersections of the third-order policy set tables, and selecting and leaving only a highest priority policy member in each intersections.

The step of discriminating a policy further comprises the steps of sectioning the received packet by the predetermined bit to obtain the packet sections, and extracting the packet information corresponding to the information including the policy, and querying the variable values corresponding to each packet information and the index values corresponding to the variables; pairing off the each index values queried in the first-order policy set tables, calculating variables from the paired index values for querying the second-order policy set tables, and querying the index values corresponding to each variable in the second-order policy set tables; pairing off the index values queried in the second-order policy set tables, calculating variables from the paired indexes for querying the third-order policy set tables, and querying the index values corresponding to each variable in the third-order policy set tables; and pairing off the index values queried in the third-order policy set tables, and calculating a variable from the paired index values for querying the fourth-order policy set table, and discriminating a final policy by querying the fourth-order policy set table with the variable.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3 and 4 are schematic views of TCP/IP packet and policy illustrating conception of a method for high speed discrimination of policy in a packet filtering type firewall system according to the present invention;

FIGS. 5 to 10 are diagrams illustrating conception of a method for high speed discrimination of policy in a packet filtering type firewall system according to the present invention;

FIGS. 14 to 20 are diagrams illustrating a method for setting a policy set table used in a case where policies set by a user are A, B, C, and D in accordance with the preferred embodiment of the present invention; and FIGS. 21 to 24 are diagrams illustrating a method for discriminating policy for a packet using policy set tables in accordance with the preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
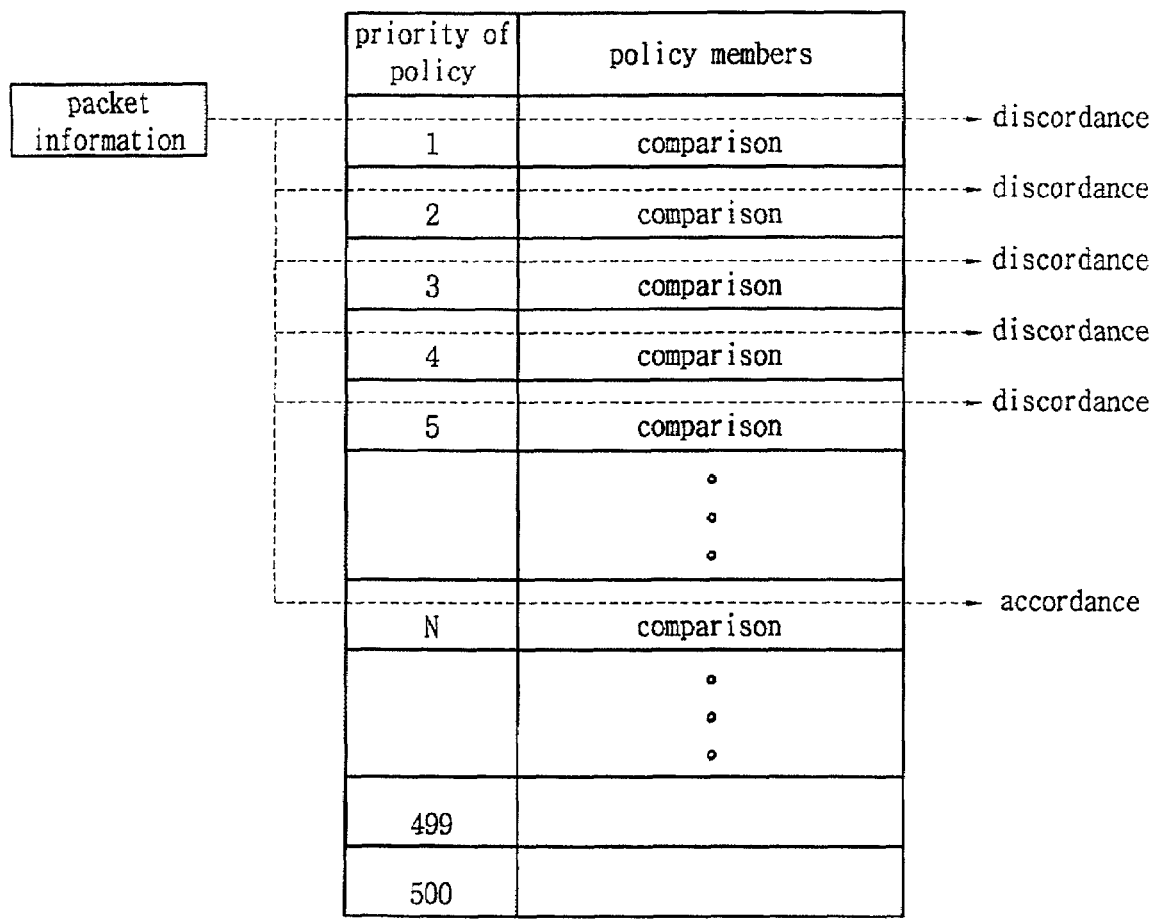
FIGS. 1 and 2 are diagrams illustrating a related art method for policy discrimination in a firewall system.
Figure 2:
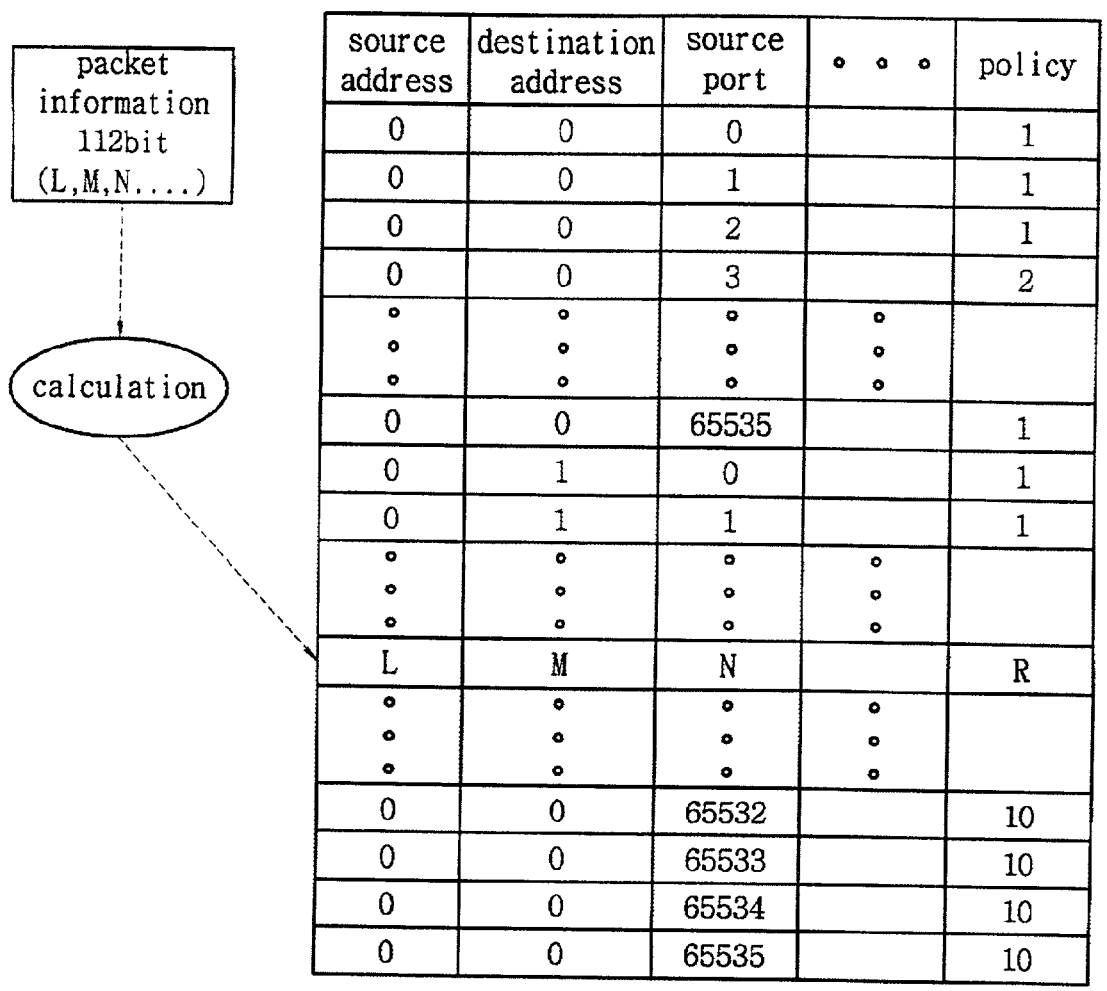
Figure 3:
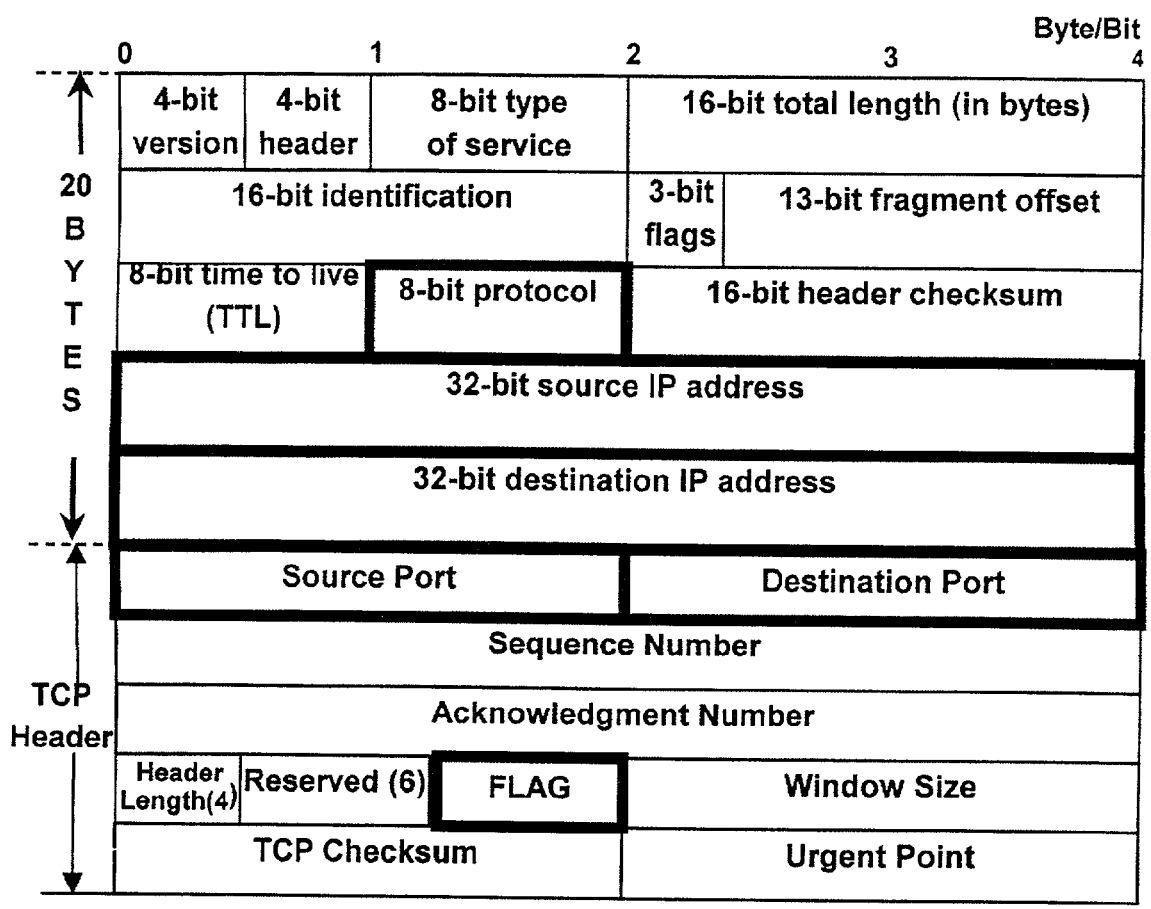

FIGS. 3 and 4 are schematic views of elements of TCP/IP packet and policy illustrating conception of a method for high speed discrimination of policy in a packet filtering type firewall system according to the present invention.

Generally, in case of data transmission, the data received at a receiving party are analyzed at high speed to select a transmission path. Then, a packet is transmitted to an opposing terminal unit based on data (header) of the receiving party attached to data of TCP/IP packet data. In a firewall of the present invention, such data are read out to search a policy inclusive of such data. If a corresponding policy exists, a process is performed according to the corresponding policy in such a manner that it blocks the corresponding packet when the policy gives a reject instruction, and it passes the corresponding packet when the policy gives an allowance instruction. If there is no corresponding policy, a process according to an instruction of a basic policy is performed.

According to this embodiment of the present invention, a first policy (i.e., a highest priority policy) among the matched policies, whose conditional terms coincide with the 112-bit packet information included in the received packet is discriminated as the final policy for the packet.

First of all, a conventional TCP/IP packet will be studied. Referring to FIG. 3, the packet contains recognizable information about its traffic type with a certain format. Herein, a packet represents a set or block of binary signal comprising data and control information that is exchanged and transmitted as a unit. The packet has a plurality of fields, control information, and error control information, etc. arranged in a certain format. In the inter-processor communications, if the entire message is exchanged at a time over an extended time period, a processor for managing the transit cannot transit other messages during the period. In order to solve the problem, a scheme that divides the message signal into a plurality of shorter blocks of constant size and transmits the blocks is adopted. The unit of the transmitted one block refers as a packet.

As illustrated in FIG. 3, each TCP/IP packet contains IP header of 20-byte long and TCP header of 20-byte long in addition to the message. The IP header with no option comprises a 4-bit Version field, a 4-bit Header Length field, a 8-bit Type of Service field, a 16-bit Total length field, a 16-bit Identification filed, a 8-bit Protocol field, a 32-bit source IP address field, and a 32-bit Destination IP address field, etc. The TCP header with no option comprises a Source Port field, a Destination Port field, a Sequence Number field, an Acknowledgment Number field, a Header Length field, a Flag field, etc.

In the IP Header, the 4-bit Version field specifies the version of IP. Presently, IP version 4 is used mostly. The Header Length field records the length of IP header in words (1 word=4 bytes). For example, if the length of IP header is 20-byte, then the Header Length field records 5. The Type of Service field instructs a router as to how the router processes a received packet. The Total length field indicates a total length of the packet, and the Identification filed identifies a unique number for the packet. When fragmentation occurs, the Identification filed is used as an indicator for identifying the same packet. The Flag field is used to indicate whether the packet is fragmented or not. A Fragment Offset field indicates where in the datagram this fragment belongs, and thus it is used for reassembly. A Time To Live field indicates the life of the packet on the Internet. And, the Protocol field indicates the format of the next of the IP header; if this field is 6 then it indicates TCP, and else if 17 then UDP. A Header Checksum field records the CRC Checksum of the header for validation of IP header in the receipt party of the network entity. The source IP address field records the source IP address of this packet, and the Destination IP address field records the destination IP address of this packet.

In the TCP Header, the Source Port field indicates the address of the socket generating the message, and the Destination Port field indicates the address of the socket receiving the message. The Sequence Number field is for a flow control, and it records the unique number of the packet in byte stream to indicate sequence number of the packet. The Acknowledgment Number field is for a flow control, and it records the unique number of the packet expected to receive from the counterpart in byte stream, and it indicates that how many packets are generated from the message. The Header Length field records the header length in words, and a Reserved field is not used presently. The Flag field indicates the classification of the message, and comprises URG, ACK, PSH, RST, SYN, and FIN. A Window Size field is for a flow control. The Window Size field contains the number of bytes that the sender is presently willing to accept at a time. A TCP Checksum records a CRC checksum of the IP header and the TCP header for validation. And, an Urgent Point field records an offset value to point the position of the data that the receiver has to process urgently. The Checksum field in the TCP header is computed for entire precedent input or transmitting data, separately, and it is located at the end of the input or the transmitting data in order to check the exactness of the entire data during the data input or transmission process. The receiving party recomputes the checksum of each of the received data, and sums up the checksums to obtain the overall checksum. And then the overall checksum is compared to the transmitted overall checksum to be verified.

As such, in the data transmission through the network, the data is divided into a plurality of packets and then each of the packets is transmitted. The IP serves to operate the transfer of the packet data from one point to other point. On the other hand, the TCP served to provide the reliable communication between pairs of processes by supporting the flow control and by checking the exactness of data.

Now, framing a policy is studied with reference to FIG. 4. According to the present invention, a policy is framed in advance with regard to the several packet fields comprising a Source IP Address field, a Destination IP Address field, a Source Port field, a Destination Port field, a Direction field, and a TCP Flag field. Accordingly, when an incoming packet is received at the system, the fields of the packet header marked with the thick lines in FIG. 3 are compared to the corresponding fields of policy to discriminate the policy, that coincides with the incoming packet among the plurality of polices.

Polices may be series of formal sentences for defining assignments of the network resources among the clients. And, the client may be an individual user, or a workstation, a host computer, or application program, etc.

Thus, among a plurality of polices framed as shown in FIG. 4, a first policy whose all fields match with the corresponding fields of the incoming packet is discriminated as the corresponding policy for the incoming packet. The total length of all the packet information related to the policy discrimination is 112 bits. Polices are generated by a network supervisor and held in a policy storage. Polices are searched and used by the network managing software while the network is operating in order to determine the intentions of the users. The terms S, D, P and Q in FIG. 4 are set to the constants or the values within the allowance ranges for the respective corresponding fields of the packet to frame a policy.

FIGS. 5 to 10 are diagrams illustrating concepts of the method for high speed discrimination of a policy in a packet filtering type firewall system according to the present invention.

Figure 5:
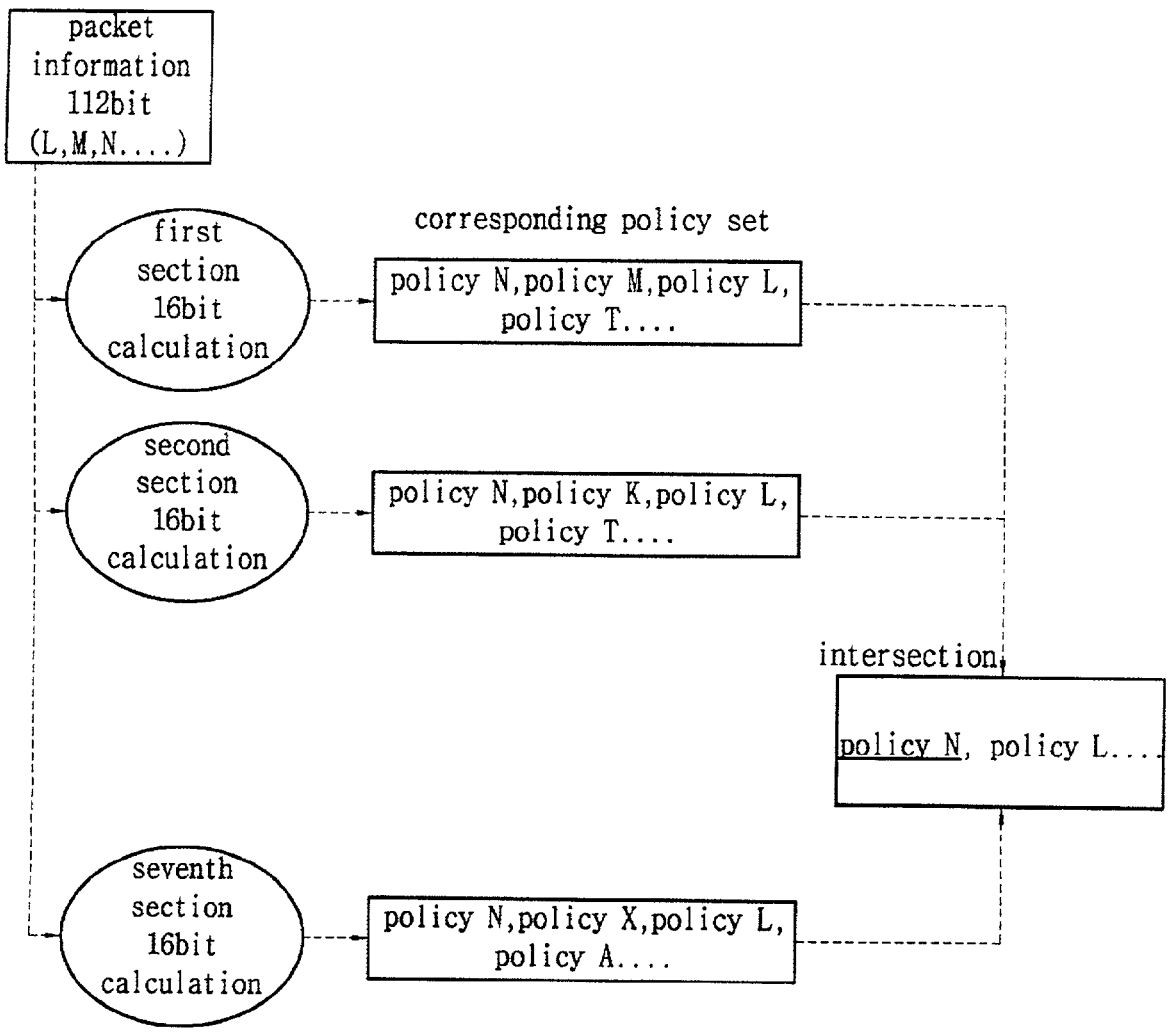
Figure 6:
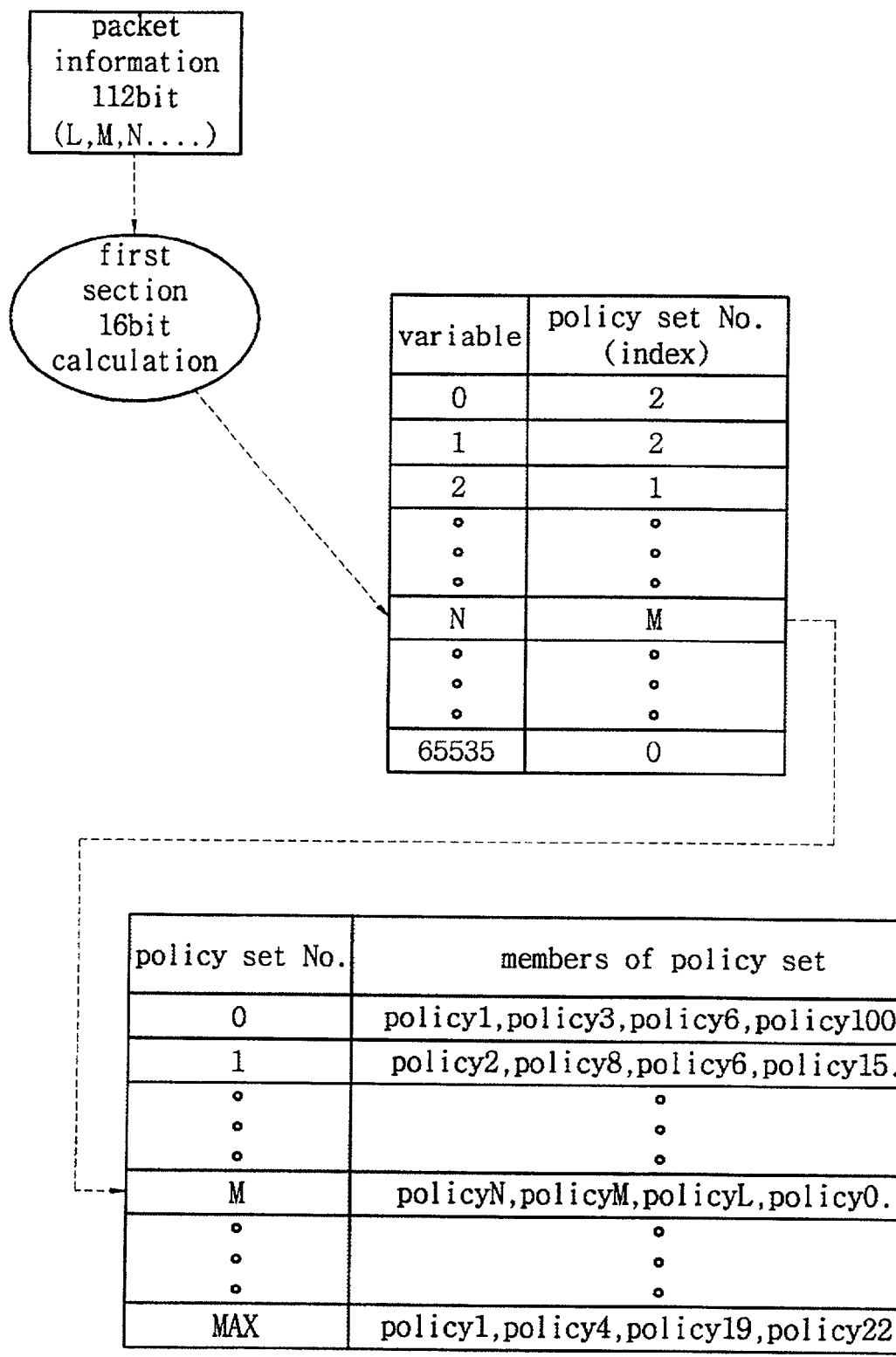

Referring to FIG. 5, the novel method equally divides the 112-bit packet information into seven 16-bit sections, and generates seven policy set tables corresponding to the seven sections, respectively. The maximum capacity of each table required for each section is $2^{16}$, i.e., 65536. This is a practically possible size. Then, there remains only an outstanding problem of how to make the searching scheme for discriminating a final policy from the policy set tables for an incoming packet.

A policy set table contains a plurality of the policy sets identified by their unique set Nos. Each sets contains at least one policy members predetermined by a user. All the possible 65536 cases of a corresponding packet section are expressed by the values of a variable from 0 to 65535. All the values of the variable from 0 to 65535 are mapped onto the policy set Nos. (or the indexes).

Each policy has a unique label in order to be distinguished from the other polices. The final policy for the packet is discriminated as the one having the highest priority from the policies contained commonly in all the 7 policy set tables corresponding to the 7 sections of the packet. However, if the polices commonly contained in all the policy set tables are searched in real time by detecting whether a certain policy member contained in a certain policy set of a policy set table is also contained in the certain policy sets of the other policy set tables, the searching speed becomes to depend on the number of polices. Thus, this scheme violates a necessary prerequisite requiring that the search scheme should be independent of the number of polices.

Accordingly, it would be preferable to set in advance all the possible intersections of the policy sets contained in the 7 policy set tables. However, because the number of the intersections reaches sometimes an unwieldy number to handle in the system, calculating all the possible intersections of the 7 policy set tables at a time becomes impractical and meaningless.

Figure 7:
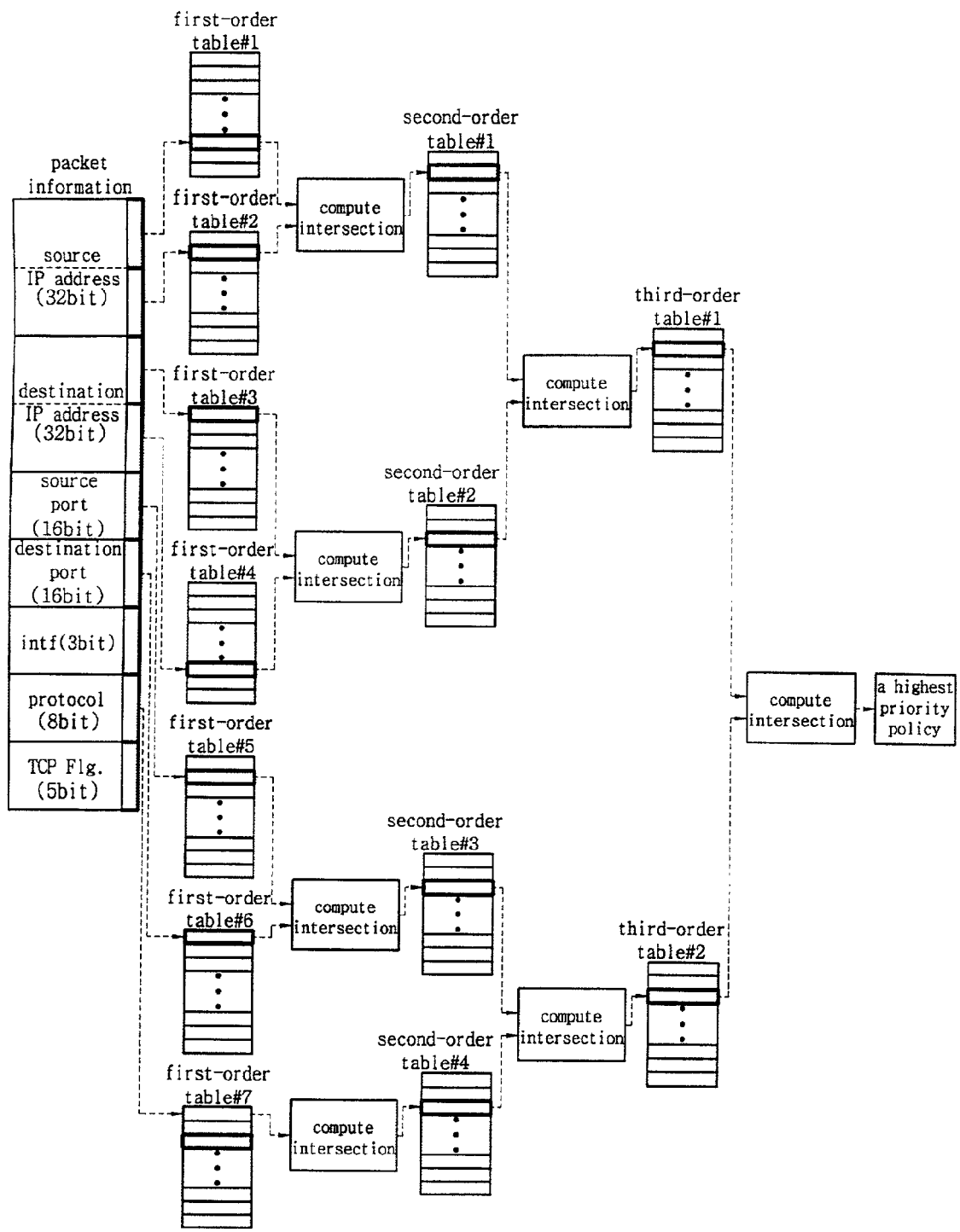

In order to solve the problems, we conceived the novel method based on the principle schematically shown in FIG. 7. That is, if the policy set tables are paired off to generate next-order policy tables with all the possible intersections of the only paired policy set tables, the number of intersections becomes a acceptable number that can be practically handled in the system.

FIG. 7 illustrates a procedure to generate the policy set tables. Referring to FIG. 7, in connection with a given packet, a final policy can be discriminated after 14 (=7+4+2+1) times computations for getting the necessary intersections.

Specifically, as illustrated in FIG. 8, a second-order policy set table #1 is generated from a pair of the first-order policy set tables #1 and #2, which are prepared for the first and second sections of the packet, respectively, by finding all the intersections of the paired policy sets between the paired first-order policy set tables. That is, the policy sets contained in the second-order policy set table #1 are just all the possible intersections of all the possible policy sets contained in the first-order policy set tables #1 and all the possible policy sets contained in the first-order policy set tables #2. The policy members of all the policy sets contained in the first order-policy set tables are predefined by a user in connection with the corresponding packet sections. Since the second-order policy set tables are derived from the 7 first-order policy set tables, total 4 second-order policy set tables are generated. It should be noted that the last first-order policy set table that fails to be paired is used as it is for a fourth second-order policy table. Then, the second-order policy set tables are paired off, and the intersections of the paired second-order policy set tables are computed to generate the third-order policy set tables. In other words, the third-order policy set table contains the intersections of the paired intersections of the originally paired first-order policy set tables. Referring to FIGS. 7 and 9, total 2 third-order policy set tables are generated. Then, the intersections of the two third-order policy set tables are calculated, as illustrated in FIG. 10 and each one policy member having a highest priority among the policy members in the respective intersections is selected to generate the fourth-order policy set table.

The series of procedures for generating the first, second, third, and fourth order tables are performed every time when there is a change of polices. However, if the packet flow is blocked while the new policy set tables are generated by the procedure after the old tables are canceled, then too many packets are lost till the new policy set tables are generated and reflected to the system. Taking such case into account, canceling the old policy set tables and generating the new policy set tables are performed in the manner illustrated in FIGS. 11 and 12.

Figure 11A:
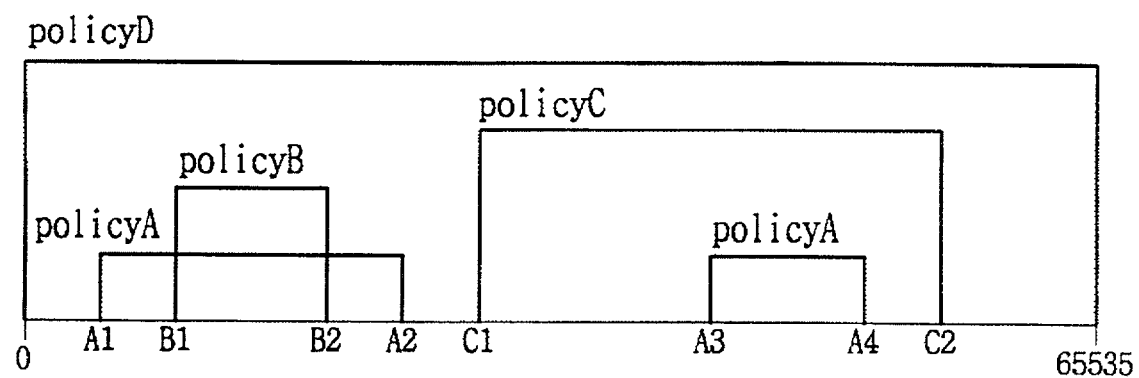
FIGS. 11 and 12 are diagrams illustrating a case where a new table is generated by removing an existing table.
Figure 11B:
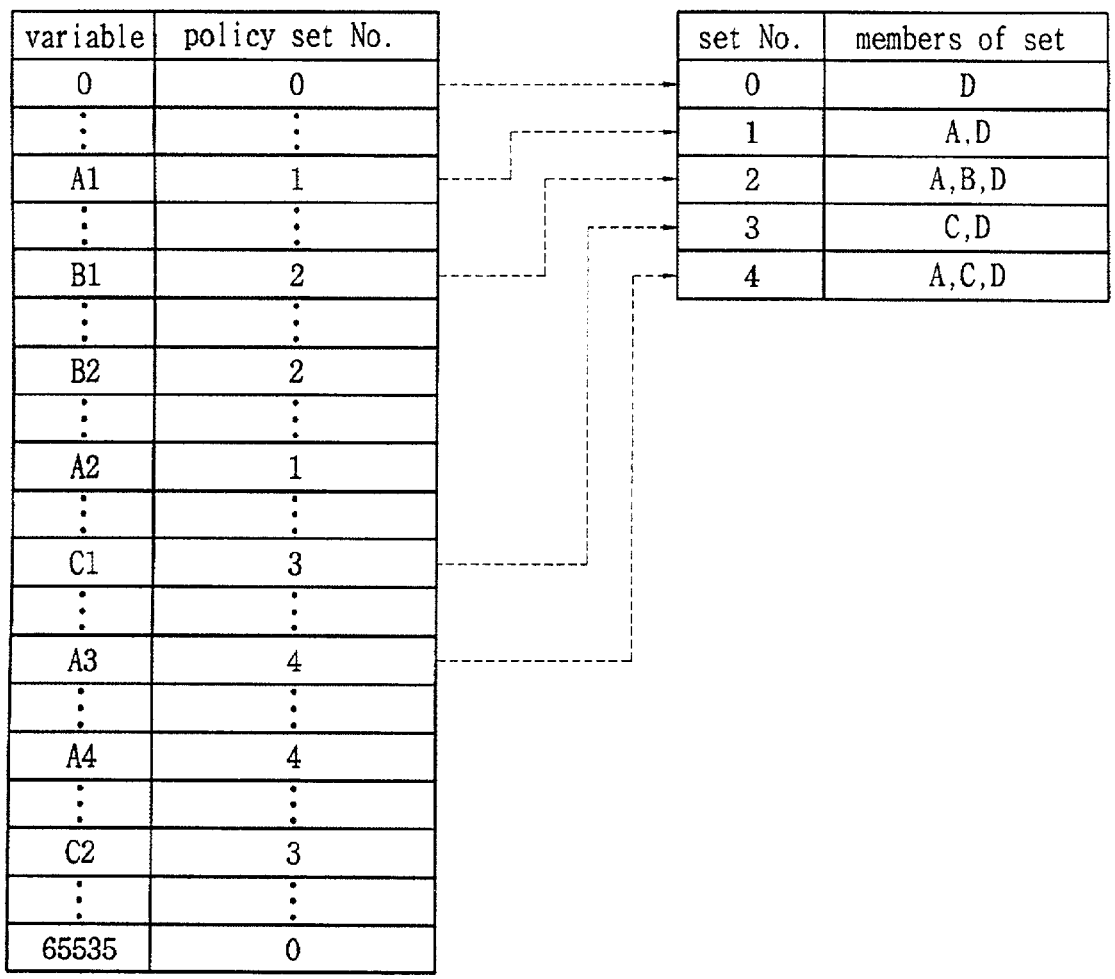

Since the packet section information considered to frame a policy is given as a range(s), the extent from the start point to the end point of the range can be mapped on the reference line having the marked points from 0 to 65535. Referring to FIG. 11a, such ranges of the polices A, B, C and D may or may not be superposed with one another so that they form a policy map. Since this policy map is accomplished by repeating a short single process loop as many times as the number of polices, this procedure is not time consuming.

And, while each of all the points on the reference line of the policy map is reading out, the ranges of policies to which the read out point belongs are checked and recorded in the first-order policy set table by using the labeled policy Nos. with reference to the variable from 0 to 65535. The ranges of the policies are checked to be overlapped with one another to remove any redundantly framed policy.

Figure 12:
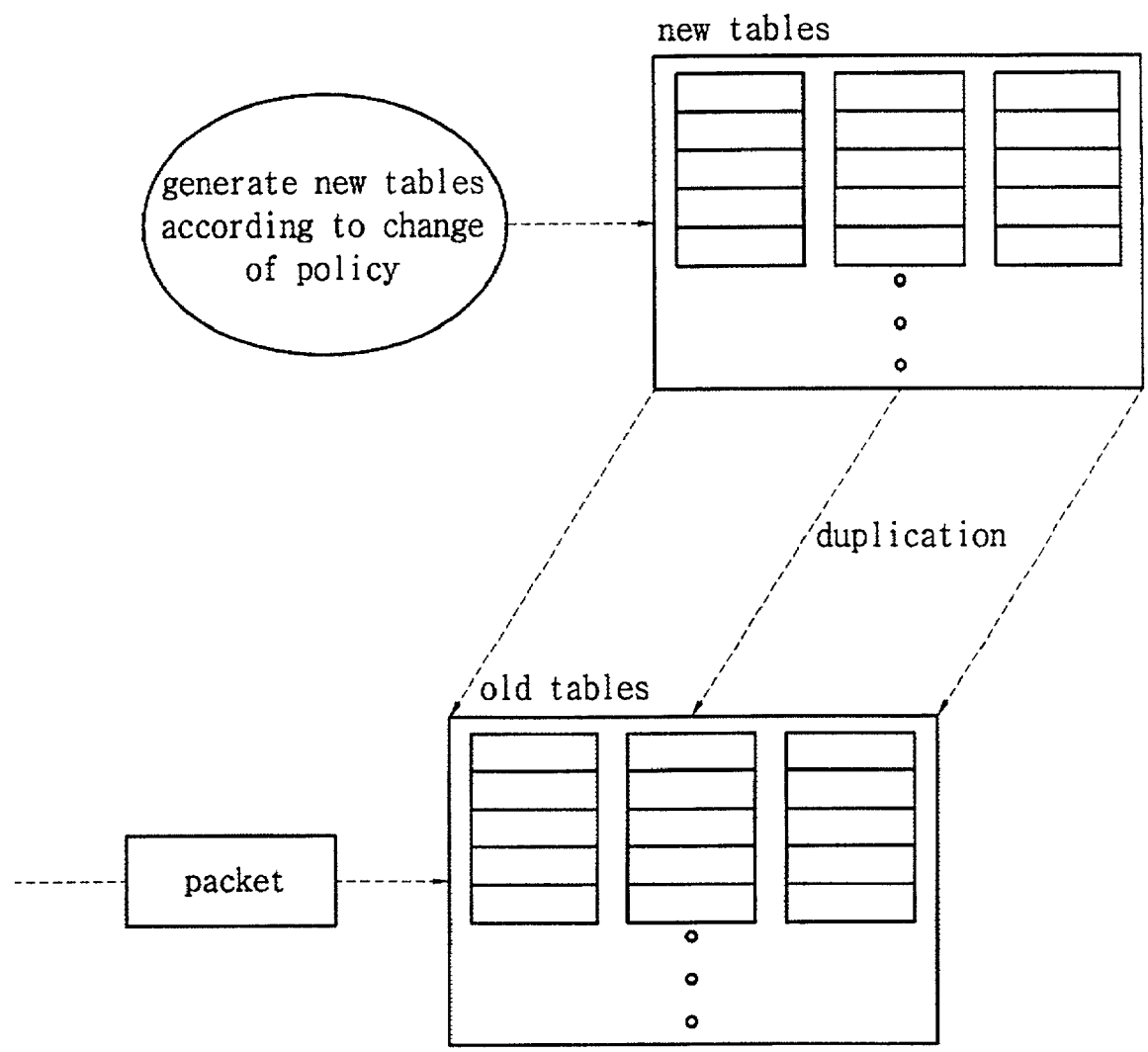

In order to prevent any interruption of other packet processing, the new policy set tables are generated on another memory that is separated from the memory storing the old policy set tables. After the new policy set tables is generated, the new policy set tables are replaced for the old policy set tables by a memory copy operation, as shown in FIG. 12. During such a period of the memory duplication, the incoming packet is blocked. But the period required for the memory duplication is too short to affect the overall traffic transmission.

Figure 13:
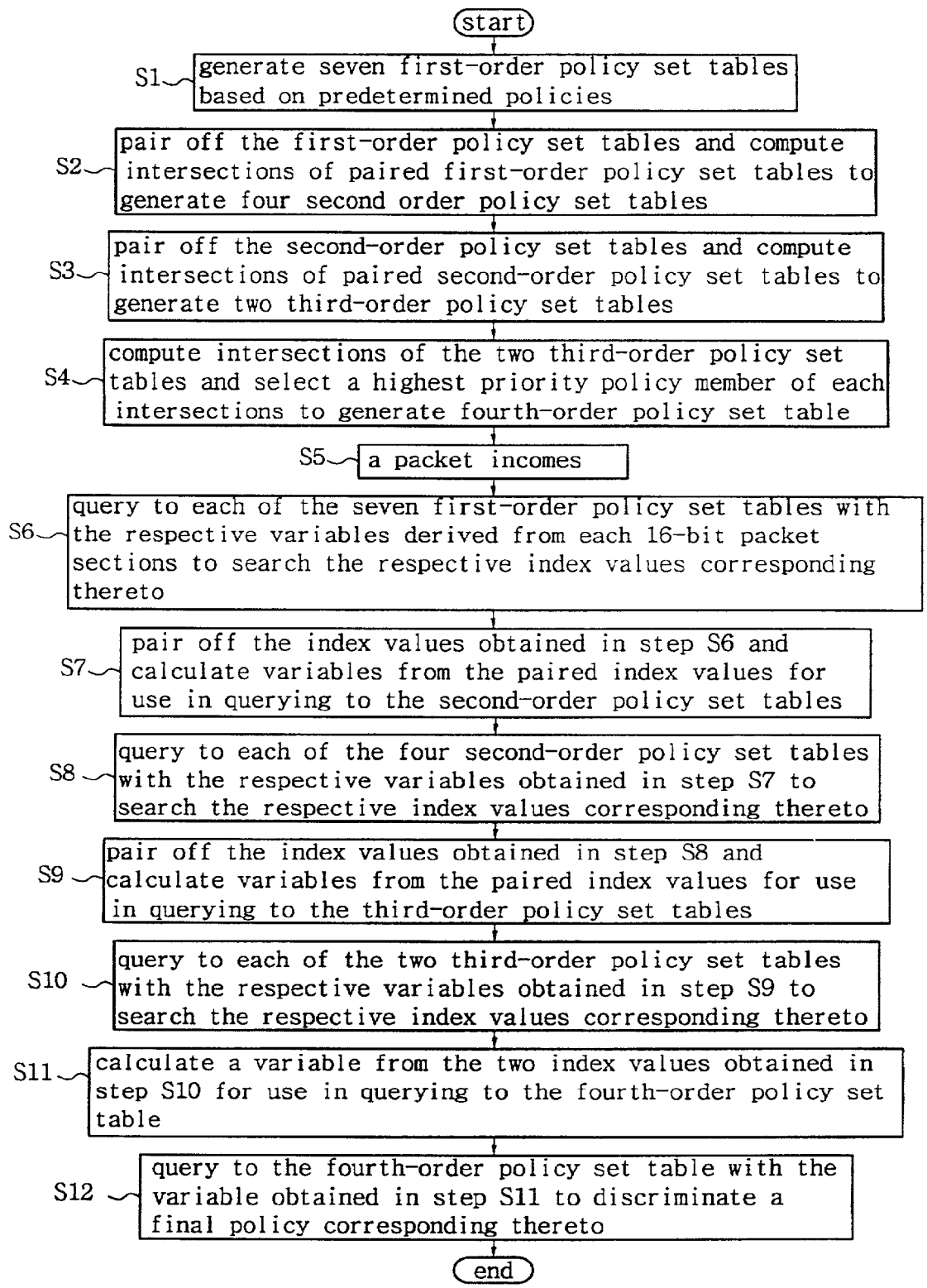
FIG. 13 is a flow chart illustrating a method for high speed discrimination of policy in a packet filtering type firewall system according to the present invention.

FIG. 13 is a flow chart illustrating the novel method for high speed discrimination of a policy in a packet filtering type firewall system according to the present invention.

First of all, the policy set table that will be used as a matching target of the packet information is generated separately for each of the packet sections, which will be explained later. Each policy set table is itemized according to the predetermined number of polices by the user. Then, the policy set tables, each of which is corresponding to the respective packet sections, are paired off. And, all the possible intersections of the paired policy set tables are computed to generate a next order policy set table.

More specifically, 7 first-order policy set tables are generated corresponding to the 7 packet sections (S1) Each of the first-order policy set tables contains a number of policy sets related to the corresponding packet section information. Each policy set may have a plurality of policy members predetermined by a user or a system supervisor. A unique policy set No. or an index is assigned to each policy set. Thus, any policy set contained in a first-order policy set table can be searched with respective index value. It should be noted that the first-order policy set tables may have a function of mapping all the possible number of cases (or variables) derived from a corresponding packet section onto all the policy set Nos. (or indexes). Alternatively, in order to separate the mapping function from the first-order policy set tables, seven first-order mapping tables can be generated additionally to preserve respective relations between all the possible variables of each packet sections and their corresponding index values of each related first-order policy set tables.

And, in order to generate the second-order policy set tables, the first-order policy set tables are paired off at first. Then, all the possible intersections of the paired first-order policy set tables are computed. The intersections constitute a second-order policy set table (S2). In other word, each second-order policy set table contains all the possible intersections of paired policy sets between the paired two first-order policy set tables. Thus, all the policy members of any policy set or any intersection contained in a second-order policy set table belong to both the corresponding paired policy sets between the paired two first-order policy set tables. Accordingly, three second-order policy set tables are generated from three pairs of the first-order policy set tables.

By the way, since the number of the first-order policy set tables is 7, an odd number, the seventh first-order policy set table remains unpaired. It is used, as it is, as a fourth second-order policy set table. Thus, totally 4 second-order policy set tables are generated. Similarly to the first-order policy set tables, a unique policy set No. or an index is assigned to each policy sets contained in the second-order policy set tables. Thus, any policy set contained in a second-order policy set table can be searched with respective index value.

Also, it should be noted that the second-order policy set tables may have a function of mapping all the possible number of paired combinations (or variables) derived from corresponding paired first-order policy set tables onto all the policy set Nos. (or indexes). Alternatively, in order to separate the mapping function from the second-order policy set tables, four second-order mapping tables can be generated additionally to preserve respective relations between all the possible variables from the paired first-order policy set tables and their corresponding index values of each related second-order policy set tables.

The 4 second-order policy set tables are paired off to generate third-order policy set tables. And, all the possible intersections of the paired second-order policy set tables are computed. The computed intersections constitute a third-order policy set table. Totally 2 third-order policy set tables are generated. Then, all the possible intersections of the 2 third-order policy set tables are computed. And, only one policy member having a highest priority order is selected for each intersections and all the unselected policy members of each intersections are deleted. The intersections constitute the fourth-order policy set table (S3–S4).

The third and fourth-order policy set tables may have indexes assigned to each policy sets contained therein and mapping functions, like the first and second-order policy set tables.

That is, the second through fourth second-order policy set tables are consisted of the intersections of the two policy set tables of the previous order, so that they comprise all the possible policy sets having only the policy members commonly belonging to the paired policy sets.

A packet is arrived (S5). And, the necessary information fields for framing the policies are extracted from the predetermined sections of the packet. And, then, the policy set tables formed in steps S3–S4 are queried to discriminate a final policy for the arrived packet by using the packet information extracted from each of the packet sections.

More specifically, when a procedure for discriminating the policy is performed, the necessary information fields for discriminating the policy are extracted from the predetermined sections of the packet, and the values of seven 16-bit sections are mapped to the corresponding index values through the related first-order policy set tables, respectively. Then, the seven index values are paired off to calculate variables for querying to the second-order policy set tables (S6–S7).

After then, four index values corresponding to the 4 new variables are found by querying to the corresponding second-order policy set tables, or alternatively by querying to the second-order variable-index mapping tables or by equivalent calculations. And, the four index values are paired off to calculate the 2 new variables for querying the 2 third-order policy set tables. And, two index values corresponding to the 2 new variables are found by querying to the corresponding third-order policy set tables, or alternatively by querying to the third-order variable-index mapping tables or by equivalent calculations (S8–S10).

Subsequently, the 2 index values are used to calculate a one new variable for querying the fourth-order policy set table. The final policy is discriminated from the fourth-order table according to the variable (S11–S12).

The information fields of the packet needed to frame the policies comprise two 16-bit source IP addresses extracted from the upper half portion and lower half portion of the original 32-bit source IP address, two 16-bit destination IP addresses extracted from the upper half portion and lower half portion of the original 32-bit destination IP address, the 16-bit source port, the 16-bit destination port, and another 16-bit information including the interface, the protocol and the TCP flag.

The variables (=a) are calculated according to the following equation (1).

$$(a) = nx_1 + y_1 \quad (1)$$

where, a is a variable, n is the total number of indexes of a second table of the paired policy set tables, $x_1$ is the index value of a first table of the paired policy set tables, $y_1$ is the index value of the second table of the paired policy set tables.

FIGS. 14–20 illustrates a preferred embodiment of the table generation procedure. In this embodiment, there are four polices A, B, C and D defined by the user.

Since the policies adopted are A, B, C and D as shown in FIG. 14, after the overall 112-bit packet information is divided into seven 16-bit sections, seven first-order policy set tables are generated for the seven sections, respectively, in terms of polices A, B, C and D. As shown in FIG. 15, each of the first-order policy set tables #1–#7 is formed by defining its items in terms of polices in connection with index values that are mapped by the 65536 variables derived from the corresponding packet section in a manner of one index to one or more variables.

Then, the seven first-order policy set tables #1–#7 are paired off. The intersections of the paired first-order policy set tables constitute the second-order policy set tables #1–#3. The procedure for computing the intersections of the paired first-order policy set tables #1 and #2 to generate the second-order policy set table #1 is illustrated in FIG. 16 in details. Referring to FIG. 16, the variable 0 (=a) to be mapped to an index value of the second-order policy set table is calculated from the index value $x_1=0$ of the first-order policy set table #1 and the index value $y_1=0$ of the first-order policy set table #2 according to the above equation (1). And, the item of the second-order policy set table corresponding to the variable a (=0) is defined as the intersection (=A and D) of the policy set (=A and D) of the first-order policy set table #1 corresponding to the index value $x_1=0$ and the policy set (=A, B and D) of the first-order policy set table #2 corresponding to the index value $y_1=0$. And, this variable a (=0) is mapped to the index value 0 that corresponds to the set of policies A and D of the second-order policy set table #1.

Similarly, the variable 1 (=a) is calculated from the index value $x_1=0$ of the first-order policy set table #1 and the index value $y_1=1$ of the first-order policy set table #2 according to the above equation (1). And, the policy set of the second-order policy set table corresponding to the variable a (=1) is defined as the intersection (=A and D) of the policy set (=A and D) of the first-order policy set table #1 corresponding to the index value $x_1=0$ and the policy set (=A, B, C and D) of the first-order policy set table #2 corresponding to the index value $y_1=1$. Accordingly, this variable a (=1) is mapped to the index value 0 that corresponds to the set of policies A and D of the second-order policy set table #1.

Next, the variable 2 (=a) is calculated from the index value $x_1=1$ of the first-order policy set table #1 and the index value $y_1=0$ of the first-order policy set table #2 according to the above equation (1). And, the item of the second-order policy set table corresponding to the variable a (=2) is defined as the intersection (=A and D) of the policy set (=A, C and D) of the item of the first-order policy set table #1 corresponding to the index value $x_1=1$ and the policy set (=A, B and D) of the item of the first-order policy set table #2 corresponding to the index value $y_1=0$. Accordingly, this variable a (=2) is also mapped to the index value 0 that corresponds to the set of policies A and D of the second-order policy set table #1.

And, the variable 3 (=a) is calculated from the index value $x_1=1$ of the first-order policy set table #1 and the index value $y_1=1$ of the first-order policy set table #2 according to the above equation (1). And, the item of the second-order policy set table corresponding to the variable a (=3) is defined as the intersection (=A, C and D) of the policy set (=A, C and D) of the item of the first-order policy set table #1 corresponding to the index value $x_1=1$ and the policy set (=A, B, C and D) of the item of the first-order policy set table #2 corresponding to the index value $y_1=1$. Accordingly, this variable a (=3) is mapped to the index value 1 that corresponds to the set of policies A, C and D of the second-order policy set table #1.

Then, the variable 4 (=a) is calculated from the index value $x_1=2$ of the first-order policy set table #1 and the index value $y_1=0$ of the first-order policy set table #2 according to the above equation (1). And, the item of the second-order policy set table corresponding to the variable a (=4) is defined as the intersection (=A, B and D) of the policy set (=A, B and D) of the item of the first-order policy set table #1 corresponding to the index value $x_1=2$ and the policy set (=A, B and D) of the item of the first-order policy set table #2 corresponding to the index value $y_1=0$. Accordingly, this variable a (=4) is mapped to the index value 2 that corresponds to the set of policies A, B and D of the second-order policy set table #1.

Lastly, the variable 5 (=a) is calculated from the index value $x_1=2$ of the first-order policy set table #1 and the index value $y_1=1$ of the first-order policy set table #2 according to the above equation (1). And, the item of the second-order policy set table corresponding to the variable a (=5) is defined as the intersection (=A, B and D) of the policy set (=A, B and D) of the item of the first-order policy set table #1 corresponding to the index value $x_1=2$ and the policy set (=A, B, C and D) of the item of the first-order policy set table #2 corresponding to the index value $y_1=1$. Accordingly, this variable a (=5) is also mapped to the index value 2 that corresponds to the set of policies A, B and D of the second-order policy set table #1.

Therefore, the second-order policy set table #1 is generated as the intersections of the first-order policy set table #1 and the first-order policy set table #2.

Figure 17:
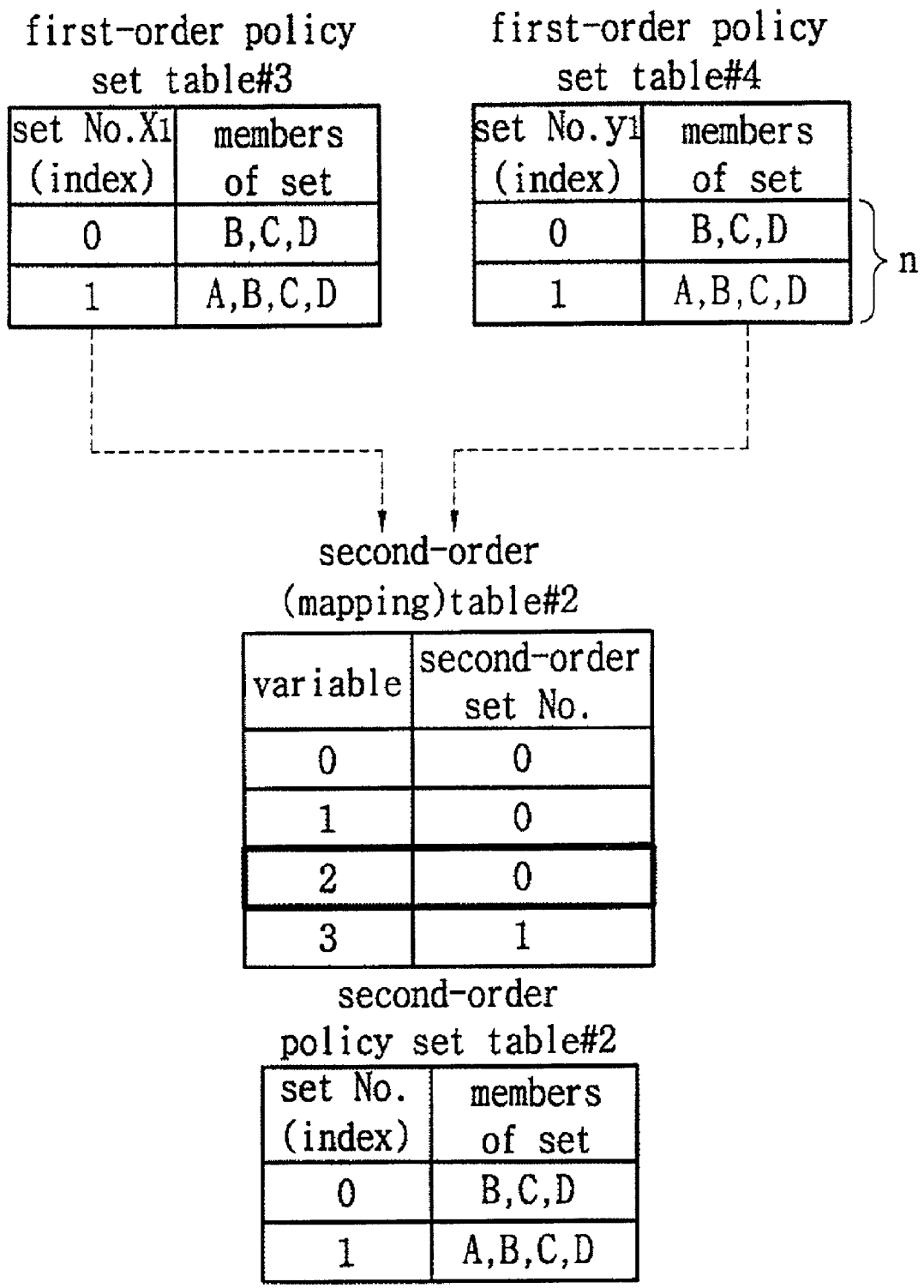
Figure 18:
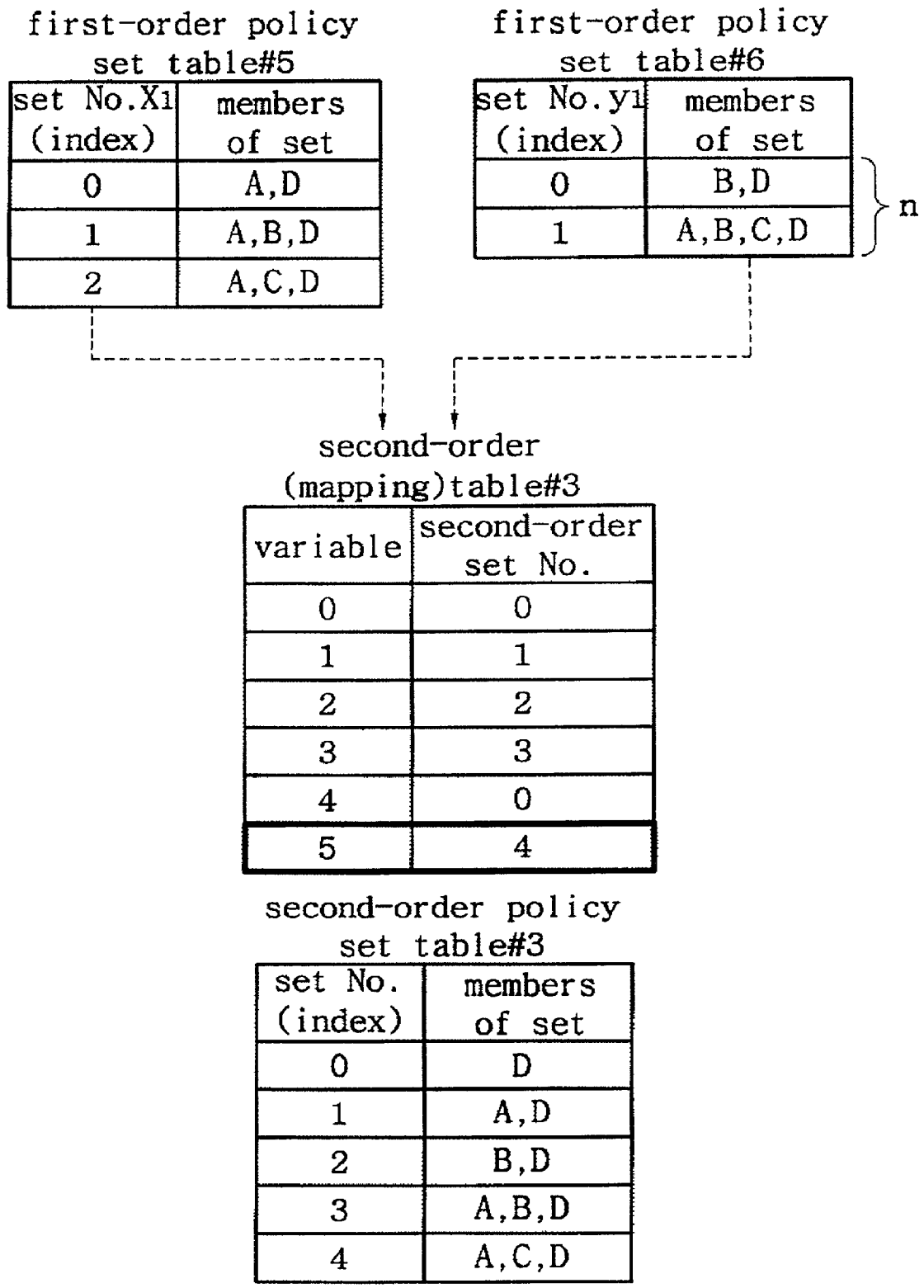

Similarly, the second-order policy set table #2 is generated as the intersection of the first-order policy set table #3 and the first-order policy set table #4, as illustrated in FIG. 17. Also, the second-order policy set table #3 is generated as the intersection of the first-order policy set table #5 and the first-order policy set table #6, as illustrated in FIG. 18. Since the first-order policy set table #7 is not paired off, it is used as the second-order policy set table #4.

After then, the second-order policy set tables #1–#4 are paired off. And, the third-order policy set tables #1–#2 are generated as the intersections of each pairs of the second-order policy set tables.

Figure 19:
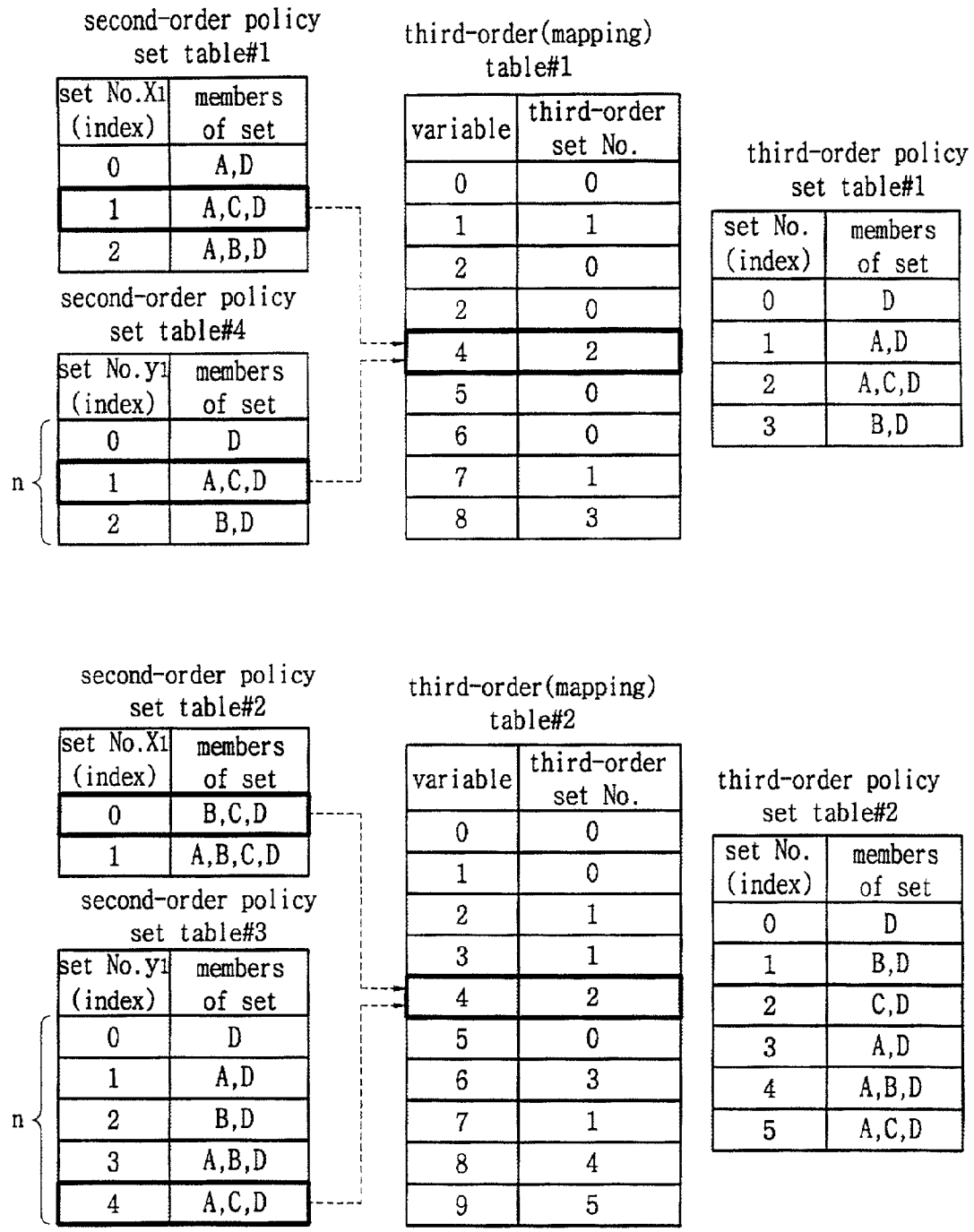

The procedure for generating the third-order policy set tables #1–#2 is studied in the following with reference to FIG. 19. This procedure is similar to the previous procedure for generating the second-order policy set tables.

Firstly, the variable 0 (=a) to be mapped to an index value of the third-order policy set table is calculated from the index value $x_1=0$ of the second-order policy set table #1 and the index value $y_1=0$ of the second-order policy set table #4 according to the above equation (1). And, the item of the third-order policy set table corresponding to the variable a (=0) is defined as the intersection (=D) of the policy set (=A and D) of the item of the second-order policy set table #1 corresponding to the index value $x_1=0$ and the policy set (=D) of the item of the second-order policy set table #4 corresponding to the index value $y_1=0$. And, this variable a (=0) is mapped to the index value 0 that corresponds to the set of policy D of the third-order policy set table #1.

The variable 1 (=a) is calculated from the index value $x_1=0$ of the second-order policy set table #1 and the index value $y_1=1$ of the second-order policy set table #4 according to the above equation (1). The item of the third-order policy set table corresponding to the variable 1 (=a) is defined as the intersection (=A and D) of the policy set (=A and D) of the item of the second-order policy set table #1 corresponding to the index value $x_1=0$ and the policy set (=A, C and D) of the second-order policy set table #4 corresponding to the index value $y_1=1$. Accordingly, this variable 1 (=a) is mapped to the index value 1 that corresponds to the set of policies A and D of the third-order policy set table #1.

Next, the variable 2 (=a) is calculated from the index value $x_1=0$ of the second-order policy set table #1 and the index value $y_1=2$ of the second-order policy set table #4 according to the above equation (1). And, the item of the third-order policy set table corresponding to the variable 2 is defined as the intersection (=D) of the policy set (=A and D) of the second-order policy set table #1 corresponding to the index value $x_1=0$ and the policy set (=B and D) of the second-order policy set table #4 corresponding to the index value $y_1=2$. Accordingly, this variable 2 is mapped to the index value 0 that corresponds to the set of policy D of the third-order policy set table #1.

The variable 3 (=a) is calculated from the index value $x_1=1$ of the second-order policy set table #1 and the index value $y_1=0$ of the second-order policy set table #4 according to the above equation (1). And, the item of the third-order policy set table corresponding to the variable 3 is defined as the intersection (=D) of the policy set (=A, C and D) of the second-order policy set table #1 corresponding to the index value $x_1=1$ and the policy set (=D) of the second-order policy set table #4 corresponding to the index value $y_1=0$. And, this variable 3 is mapped to the index value 0 that is previously defined to correspond to the set of policy D of the third-order policy set table #1.

After then, the variable 4 (=a) is calculated from the index value $x_1=1$ of the second-order policy set table #1 and the index value $y_1=1$ of the second-order policy set table #4 according to the above equation (1). And, the item of the third-order policy set table corresponding to the variable 4 is defined as the intersection (=A, C and D) of the policy set (=A, C and D) of the item of the second-order policy set table #1 corresponding to the index value $x_1=1$ and the policy set (=A, C and D) of the second-order policy set table #4 corresponding to the index value $y_1=1$. Accordingly, this variable 4 is mapped to the index value 2 that corresponds to the set of policies A, C and D of the third-order policy set table #1.

Next, the variable 5 (=a) is calculated from the index value $x_1=1$ of the second-order policy set table #1 and the index value $y_1=2$ of the second-order policy set table #4. And, the intersection (=D) of the policy set (= A, C and D) of the second-order policy set table #1 corresponding to the index value $x_1=1$ and the policy set (=B and D) of the second-order policy set table #4 corresponding to the index value $y_1=2$ is calculated. Accordingly, this variable 5 is mapped to the index value 0 that corresponds to the set of policy D of the third-order policy set table #1.

The variable 6 (=a) is calculated from the index value $x_1=2$ of the second-order policy set table #1 and the index value $y_1=0$ of the second-order policy set table #4. And, the intersection (=D) of the policy set (=A, B and D) of the second-order policy set table #1 corresponding to the index value $x_1=2$ and the policy set (=D) of the second-order policy set table #4 corresponding to the index value $y_1=0$ is calculated. Accordingly, this variable 6 is mapped to the index value 0 that corresponds to the set of policy D of the third-order policy set table #1.

And, the variable 7 (=a) is calculated from the index value $x_1=2$ of the second-order policy set table #1 and the index value $y_1=1$ of the second-order policy set table #4. And, the intersection (=A and D) of the policy set (=A, B and D) of the second-order policy set table #1 corresponding to the index value $x_1=2$ and the policy set (=A, C and D) of the second-order policy set table #4 corresponding to the index value $y_1=1$ is calculated. Accordingly, this variable 7 is mapped to the index value 1 that corresponds to the set of policies A and D of the third-order policy set table #1.

Finally, the variable 8(=a) is calculated from the index value $x_1=2$ of the second-order policy set table #1 and the index value $y_1=2$ of the second-order policy set table #4. And, the intersection (=B and D) of the policy set (=A, B and D) of the second-order policy set table #1 corresponding to the index value $x_1=2$ and the policy set (=B and D) of the second-order policy set table #4 corresponding to the index value $y_1=2$ is calculated. Accordingly, this variable 8 is mapped to the index value 3 that corresponds to the set of policies B and D of the third-order policy set table #1.

Therefore, the third-order policy set table #1 is generated as the intersection of the second-order policy set table #1 and the second-order policy set table #4.

Similarly, the third-order policy set table #2 is generated as the intersection of the second-order policy set table #2 and the second-order policy set table #3.

The scheme of pairing the second-order policy set tables can be selected by the user preferences. In this embodiment, the second-order policy set table #1 and the second-order policy set table #4 are paired off, and the second-order policy set table #2 and the second-order policy set table #3 are paired off. Thus, the intersection of the second-order policy set table #1 and the second-order policy set table #4 is defined as the third-order policy set table #1, and the intersection of the second-order policy set table #2 and the second-order policy set table #3 is defined as the third-order policy set table #2.

However, other pairing schemes can be adopted. For example, the second-order policy set tables #1 and #2 can be paired off to generate the third-order policy set table #1, and the second-order policy set tables #3 and #4 can be paired off to generate the third-order policy set table #2.

After then, the fourth-order policy set table is generated with the subsets each of which consists of the single policy element having the highest priority among the elements of each of the intersections of the third-order policy set tables #1 and #2.

The procedure for generating the fourth-order policy set table is studied in the following with reference to FIG. 20.

The fourth-order policy set table is generated as the intersections of the third-order policy set tables #1 and #2. This procedure is similar to the above procedures for generating the first, second and third-order policy set tables, except that it has the subsets each of which consists of the single policy element having the highest priority among the elements of each of the intersections of the third-order policy set tables #1 and #2. The number (=24) of variables of the fourth-order policy set table can be calculated by multiplying the number (=4) of indexes of the third-order policy set table #1 by the number (=6) of indexes of the third-order policy set table #2.

For example, the variable 14(=a) is calculated from the index value $x_1=2$ of the third-order policy set table #1 and the index value $y_1=2$ of the third-order policy set table #2. And, the intersection (=C and D) of the policy set (=A, C and D) of the third-order policy set table #1 corresponding to the index value $x_1=2$ and the policy set (=C and D) of the third-order policy set table #2 corresponding to the index value $y_1=2$ is calculated. However, only the single element C having the highest priority among the elements (C and D) of the intersection is selected as the member of the final policy set of the fourth-order policy set table corresponding to the variable 14.

Similarly, the variable 16 (=a) is calculated from the index value $x_1=2$ of the third-order policy set table #1 and the index value $y_1=4$ of the third-order policy set table #2. And, the intersection (=A and D) of the policy set (=A, C and D) of the third-order policy set table #1 corresponding to the index value $x_1=2$ and the policy set (=A, B and D) of the third-order policy set table #2 corresponding to the index value $y_1=4$ is calculated. However, in this time, only the single element A having the highest priority among the elements (A and D) of the intersection is selected as the member of the final policy set of the fourth-order policy set table corresponding to the variable 16. The fourth-order policy set table is generated in this way.

Accordingly, each of the first through fourth-order policy set tables reflects all the possible sets of policies in its ordered state. Particularly, each of the second through fourth-order policy set tables reflects all the possible sets of policies between the paired policy set tables of previous order.

FIGS. 21 through 24 illustrate a preferred embodiment of the procedures for discriminating the final policy for an incoming packet by querying to the policy set tables generated in terms of four polices A, B, C and D.

Firstly, when a packet arrives at the system, several fields or sections of the packet that were taken into account when the user framed the policies are extracted from the packet to form 112-bit packet information related to the policy discrimination. The 112-bit packet information is divided equally into seven 16-bit sections. And, the final policy for the packet is discriminated by querying to the policy set tables generated in advance as explained above with the computed variables and indexes.

More specifically, each of the seven first-order policy set tables is inquired in order to search the respective index values corresponding to each variables derived from the 16-bit packet sections.

For example, the fields of the packet needed to frame the policies comprises two 16-bit source IP addresses extracted from the upper half portion and lower half portion of the original 32-bit source IP address, two 16-bit destination IP addresses extracted from the upper half portion and lower half portion of the original 32-bit destination IP address, the 16-bit source port, the 16-bit destination port, and the 16-bit information consisted of the 3-bit interface, the 8-bit protocol and the 5-bit TCP flag.

In this preferred embodiment, the packet is assumed to contain the information as illustrated in FIG. 21 in connection with the policy discrimination. In order to discriminate a policy for the packet, querying or searching the policy set tables that are generated through the procedures illustrated in FIGS. 14–20 are performed.

Figure 22:
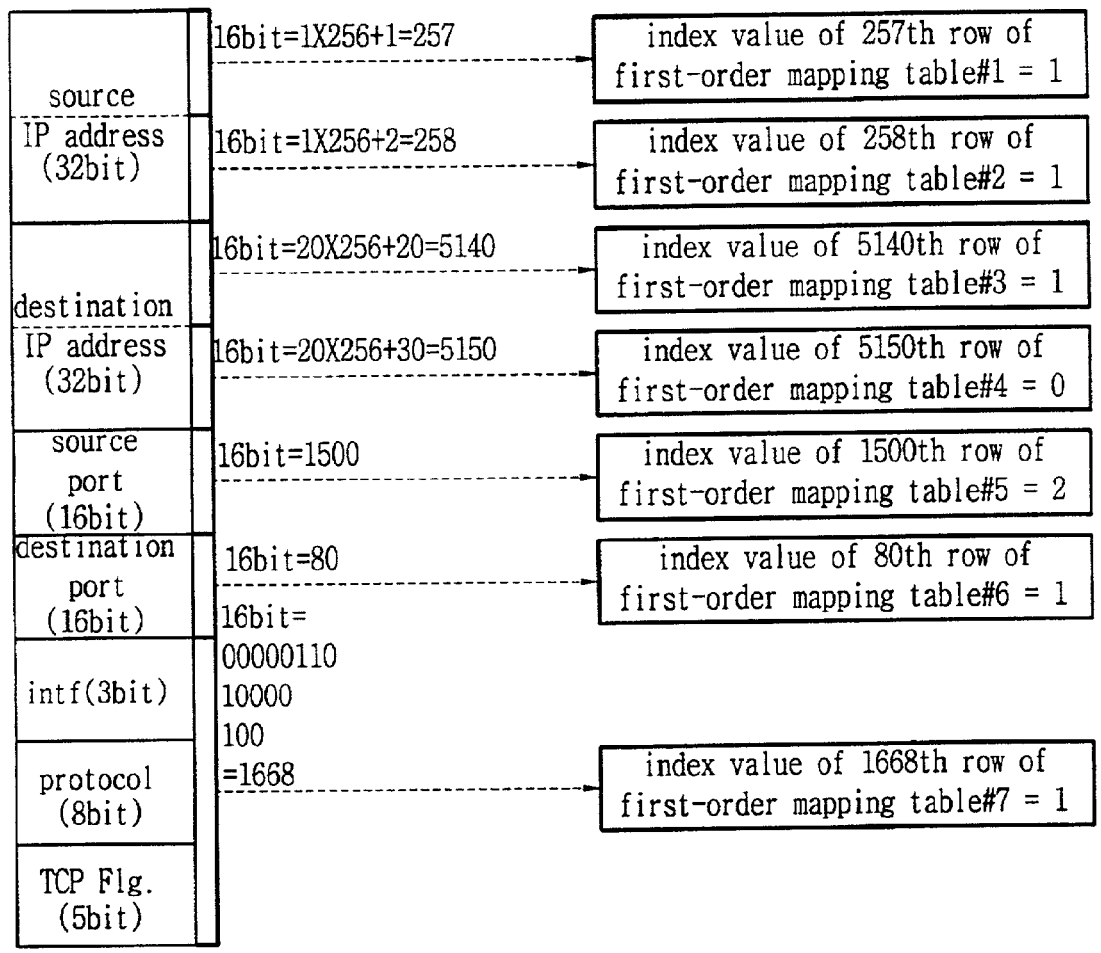

Referring to FIG. 22, the first 16-bit source IP address is read out from the packet information, and the variable corresponding to the first 16-bit source IP address 1.1 is computed to 1×256+1=257. And, the index value 1 of the first-order policy set table #1 corresponding to the computed variable 257 is found from the first-order mapping table #1.

After then, the second 16-bit source IP address is read out from the packet information, and the variable corresponding to the second 16-bit source IP address 1.2 is computed to 1×256+2=258. And, the index value 1 of the first-order policy set table #2 corresponding to the variable 258 is found from the first-order mapping table #2.

And, the first 16-bit destination IP address is read out from the packet information, and the variable corresponding to the first 16-bit destination IP address 20.20 is computed to 20×256+20=5140. And, the index value 1 of the first-order policy set table #3 corresponding to the variable 5140 is found from the first-order mapping table #3.

The second 16-bit destination IP address is read out from the packet information, and the variable corresponding to the first 16-bit destination IP address 20.30 is computed to 20×256+30=5150. And, the index value 0 of the first-order policy set table #4 corresponding to the variable 5150 is found from the first-order mapping table #4.

And, the 16-bit source port is read out from the packet information, and the variable corresponding to the 16-bit source port is computed to 1500. The index value 2 of the first-order policy set table #5 corresponding to the variable 1500 is found from the first-order mapping table #5.

And, the 16-bit destination port is read out from the packet information, and the variable corresponding to the 16-bit destination port is computed to 80. The index value 1 of the first-order policy set table #6 corresponding to the variable 80 is found from the first-order mapping table #6.

Lastly, the 16-bit information including the 3-bit interface, the 8-bit protocol and the 5-bit TCP flag is read out from the packet information, and the variable corresponding to the 16-bit information is computed to 1668. The index value 1 of the first-order policy set table #7 corresponding to the variable 1668 is found from the first-order mapping table #7.

Subsequently, the seven index values are paired off in order to compute the variables for querying to the second-order policy set tables.

Figure 23:
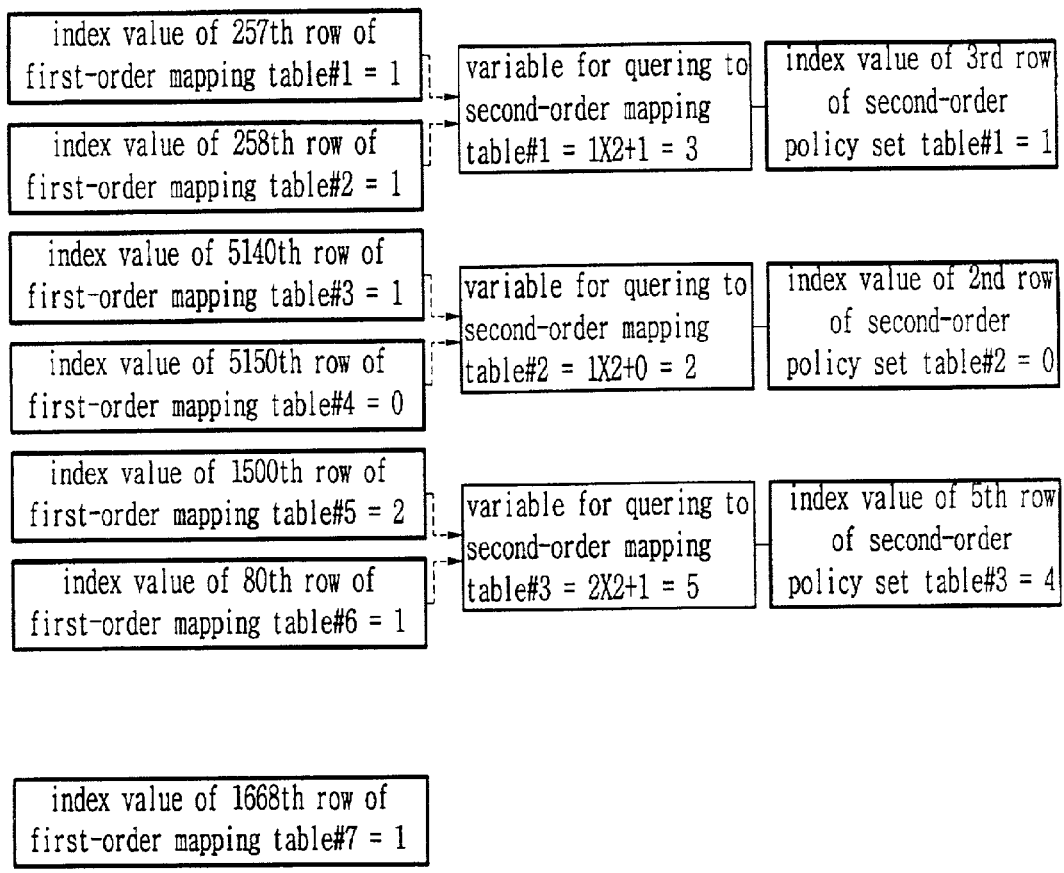

Referring to FIG. 23, the variable 3 is computed from the index value $x_1=1$ of the first-order policy set table #1 and the index value $y_1=1$ of the first-order policy set table #2 according to the computation 1×2+1=3 of equation (1). And, the variable 3 is mapped to the index value 1 through the second-order mapping table #1 for querying to the second-order policy set table #1.

And, the variable 2 is computed from the index value $x_1=1$ of the first-order policy set table #3 and the index value $y_1=0$ of the first-order policy set table #4 according to the computation 1×2+0=2 of the equation (1). And, the variable 2 is mapped to the index value 0 of the second-order policy set table #2 through the second-order mapping table #2.

And, the variable 5 is computed from the index value $x_1=2$ of the first-order policy set table #5 and the index value $y_1=1$ of the first-order policy set table #6 according to the computation 2×2+1=5 of equation (1). And, the variable 5 is mapped to the index value 4 through the second-order mapping table #3 for querying to the second-order policy set table #3.

Lastly, the index value 1 corresponding to the variable 1668 is used as the index value of the second-order policy set table #4 (i.e., the first-order policy set table #7 is used as the second-order policy set table #4 in this example).

Figure 24:
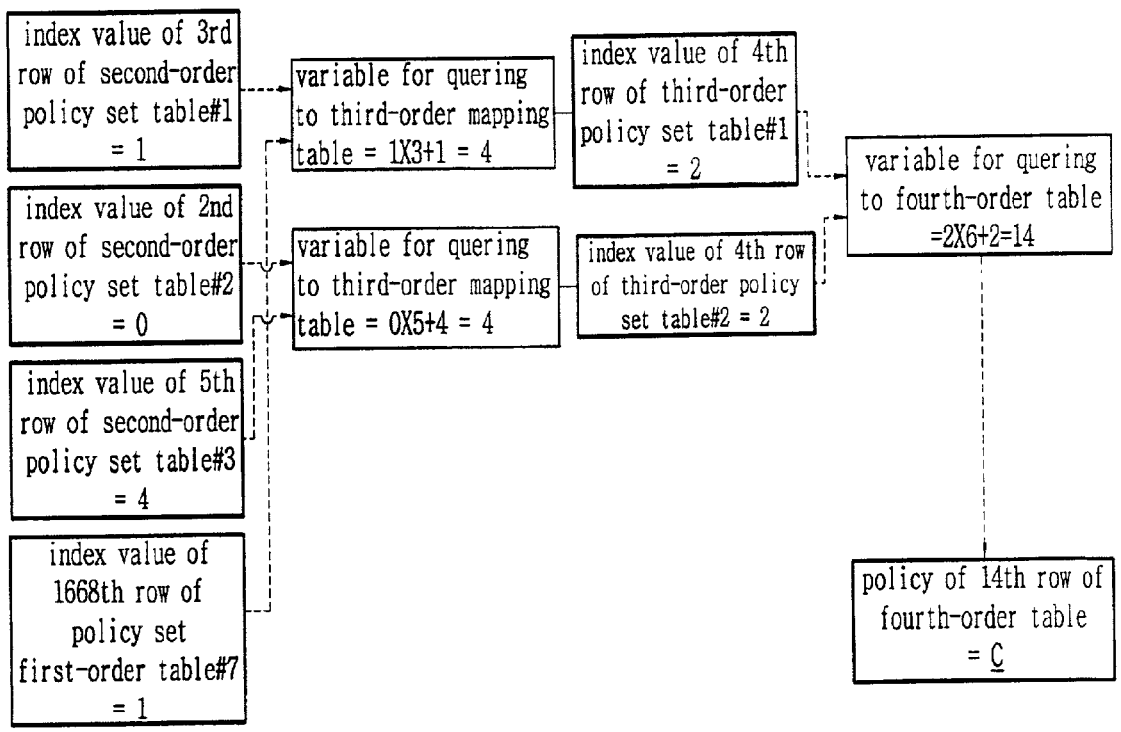

The obtained four index values of the second-order policy set tables are paired off to compute the variables for querying to the third-order policy set tables. Referring to FIG. 24, the variable a=4 that will be mapped to the index value of the third-order policy set table #1 is computed from the index value $x_1=1$ of the second-order policy set table #1 and the index value $y_1=1$ of the first-order policy set table #7 (or the second-order policy set table #4) according to the computation 1×3+1=4 of equation (1). And, this variable 4 is mapped to the index value 2 through the third-order variable-to-index mapping table #1.

And, variable a=4 that will be mapped to the index value of the third-order policy set table #2 is computed from the index value $x_1=0$ of the second-order policy set table #2 and the index value $y_1=4$ of the second-order policy set table #3 according to the computation 0×5+4= 4 of the equation (1). And, this variable 4 is mapped to the index value 2 through the third-order mapping table #2.

Lastly, the two index values obtained by querying to the third-order mapping tables are used to compute the variable that will be used as the index value for querying to the fourth-order policy set table. That is, the variable a=14 is computed form the index value $x_1=2$ of the third-order policy set table #1 and the index value $y_1=2$ of the third-order policy set table #2 according to the computation 2×6+2=14 of the equation (1). This variable a=14 is mapped to the policy C of the fourteenth set (row) of the fourth-order policy set table.

Therefore, the policy C is finally discriminated as the policy for the packet illustrated in FIG. 21 by querying to the first through third-order mapping tables and the fourth-order policy set table. Since the first through third-order policy set tables can be embodied to perform the function of mapping the variables to the corresponding index values, the final policy for the packet can be discriminated by querying to the first through fourth-order policy set tables.

According to the present invention, the deterioration of the network performance due to the policy discrimination for incoming packets is avoided by minimizing the required time to discriminate the policy regardless of the number of policies set by the user and the number of the contemporary accessing users. Also, the present invention provides the benefits to maintain high-speed network performance in the firewall system based on the high-speed traffic policy distinction algorithm regardless of the number of policies set by the user and the number of contemporary accessing users.

While the present invention has been described and illustrated herein with reference to the preferred embodiments thereof, it will be apparent to those skilled in the art that various modifications and variations can be made therein without departing from the spirit and scope of the invention. Thus, it is intended that the present invention cover the modifications and variations of this invention that come within the scope of the appended claims and their equivalents.

What is claimed is:

1. A method for high speed discrimination of a policy in a packet filtering type firewall system, the method comprising the steps of:

(A) setting policy set tables for minimizing a required time to discriminate the policy among a plurality of policies for an incoming packet, wherein the step of setting policy set tables comprising the sub-steps of:

(a1) generating a plurality of first-order policy set tables containing policy information to be compared with packet information sectioned by a predetermined bits in the packet;

(a2) pairing off the plurality of first-order policy set tables arbitrarily, and generating a plurality of second-order policy set tables constituted policy members which belong to both paired first-order policy set tables; and (a3) generating sequentially at least one post-second order policy set tables including k-th (where, 3≦k, k is a natural number) order policy set tables by pairing off (k-1)-th order policy set tables arbitrarily, and generating k-th order policy set tables constituted the policy members which belong to paired (k-1)-th order policy set tables in common; and (B) discriminating the policy firstly conformed to each condition of the fields of the incoming packet information from the plurality of policies as a final policy corresponding to the packet, wherein the step of discriminating a policy comprising the steps of:

(b1) sectioning the packet to obtain the packet sections, and extracting the packet variables which is an object to be compared with the policy information contained in the first-order policy set tables; and (b2) querying to the first through K-th order policy set tables sequentially by using the index values corresponding to the packet variables extracted from the packet sections obtained by sectioning the packet with the predetermined bits, and discriminating the final policy by using the queried index values.

2. The method of claim 1, wherein the step of setting policy set tables comprising the steps of:

generating a predetermined number of tables so that the first-order policy set tables constituted with the predetermined number by the user is correspondence to the number of the sectioned packet with the predetermined bits;

pairing off the first-order policy set tables arbitrarily, and generating second-order policy set tables constituted all available intersections of the paired first-order policy set tables;

pairing off the second-order policy set tables arbitrarily, and generating third-order policy set tables constituted all available intersections of the paired second-order policy set tables; and generating fourth-order policy set table constituted all available intersections of the third-order policy set tables, and selecting and leaving only a highest priority policy member in each intersections.

3. The method of claim 2, wherein one first-order policy set table unpaired is used as a second-order policy set table.

4. The method of claim 1, wherein each of the first-order policy set tables includes the index values corresponding to the variables having each information to be compared to the packet information in the incoming packet, and the policy sets corresponding to each index values.

5. The method of claim 2, wherein each of the first-order policy set tables includes the index values corresponding to the variables having each information to be compared to the packet information in the incoming packet, and the policy sets corresponding to each index values.

6. The method of claim 2, wherein each numbers of said first-order, second-order, third-order and k-th order policy set tables are 7, 4, 2 and 1, respectively.

7. The method of claim 2, wherein each of said second through fourth-order policy set tables comprises all the intersections of all the paired policy sets derived between the corresponding paired policy set tables of previous-order.

8. The method of claim 1, wherein the step of setting policy set tables, in case of replacing new policy set tables for old policy set tables, further comprises the steps of:
generating a policy map by diagramming ranges of one or more polices for a section of packet information through their respective conditional extents from start points to end points on a reference line having points from 0 to 65535; and
generating a new first-order policy set tables by referring to all possible point numbers from 0 to 65535 on the reference line together with the policy members spanning their own ranges on the reference line in the policy map.

9. The method of claim 8, wherein said step of generating a new first-order policy set tables comprises the steps of:
detecting whether any policy members in the policy map are duplicated one another; and
labeling each of the policy members with a unique policy label.

10. The method of claim 1, wherein the step of setting policy set tables, in case of replacing new policy set tables for old policy set tables, further comprises the steps of:
generating new policy set tables in another memory separated from the existing memory containing said old policy set tables; and
replacing said new policy set tables for said old policy set tables in the existing memory instantaneously upon completing the generation of said new policy set tables.

11. The method of claim 1, wherein the step of discriminating a policy comprising the steps of:
sectioning the received packet by the predetermined bit to obtain the packet sections, and extracting the packet information corresponding to the information including the policy, and querying the variable values corresponding to each packet information and the index values corresponding to the variables;
pairing off the each index values queried in the first-order policy set tables, calculating variables from the paired index values for querying the second-order policy set tables, and querying the index values corresponding to each variable in the second-order policy set tables;
pairing off the index values queried in the second-order policy set tables, calculating variables from the paired indexes for querying the third-order policy set tables, and querying the index values corresponding to each variable in the third-order policy set tables; and
pairing off the index values queried in the third-order policy set tables, and calculating a variable from the paired index values for querying the fourth-order policy set table, and discriminating a final policy by querying the fourth-order policy set table with the variable.

12. The method of claim 11, wherein said packet information comprises two 16-bit source IP addresses extracted from the upper half portion and lower half portion of an original 32-bit source IP address, two 16-bit destination IP addresses extracted from the upper half portion and lower half portion of a original 32-bit destination IP address, a 16-bit source port, a 16-bit destination port, and another 16-bit information consisted of a 3-bit interface, a 8-bit protocol and a 5-bit TCP flag.

13. The method of claim 11, wherein said steps of calculating variables use the following equation $$(a) = nx_1 + y_1$$

where, a is the variable, n is the total number of indexes of a second table of the paired policy set tables, $x_1$ is an index value of a first table of the paired policy set tables, and $y_1$ is an index value of the second table of the paired policy set tables.

* * * * *